US009817281B2

(12) United States Patent
Kwon et al.

(10) Patent No.: US 9,817,281 B2
(45) Date of Patent: Nov. 14, 2017

(54) LIQUID CRYSTAL DISPLAY

(71) Applicant: Samsung Display Co., Ltd., Yongin-si, Gyeonggi-do (KR)

(72) Inventors: Oh Jeong Kwon, Hwaseong-si (KR); Yeo Geon Yoon, Suwon-si (KR); Sei-Yong Park, Suwon-si (KR); Dong-Chul Shin, Seoul (KR); Hyeok Jin Lee, Seongnam-si (KR); Jin Won Kim, Suwon-si (KR); Ki Chul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/877,678

(22) Filed: Oct. 7, 2015

(65) Prior Publication Data

US 2016/0154281 A1    Jun. 2, 2016

(30) Foreign Application Priority Data

Nov. 28, 2014   (KR) ........................ 10-2014-0168658

(51) Int. Cl.
    *G02F 1/1343*      (2006.01)
    *G02F 1/1333*      (2006.01)
    *G02F 1/1362*      (2006.01)

(52) U.S. Cl.
    CPC .... *G02F 1/134309* (2013.01); *G02F 1/13624* (2013.01); *G02F 1/133305* (2013.01); *G02F 2001/134345* (2013.01)

(58) Field of Classification Search
    CPC ................................................ G02F 1/134309
    See application file for complete search history.

(56) References Cited

U.S. PATENT DOCUMENTS

2010/0033470 A1*   2/2010   Lee ..................... G02F 1/13624
                                                                               345/212
2012/0314168 A1   12/2012   Kang et al.
2013/0027640 A1   1/2013   Lee et al.
(Continued)

FOREIGN PATENT DOCUMENTS

| KR | 10-2005-0112630 | 12/2005 |
|---|---|---|
| KR | 10-2009-0103461 | 10/2009 |
| KR | 10-2012-0082472 | 7/2012 |

(Continued)

*Primary Examiner* — Douglas Menz
(74) *Attorney, Agent, or Firm* — Innovation Counsel LLP

(57) ABSTRACT

A liquid crystal display according to an exemplary embodiment of the present inventive concept includes: a first insulating substrate; a gate line and a data line, a thin film transistor connected to the gate line and the data line, a pixel electrode connected to the thin film transistor, and a second insulating substrate facing the first insulating substrate, wherein one pixel includes the thin film transistor and the pixel electrode and includes a first sub-region and a second sub-region which are separated by the gate line intervened therebetween, the high gradation sub-pixel electrode includes a first high gradation sub-pixel electrode disposed in the first sub-region, and a second high gradation sub-pixel electrode disposed in the second sub-region, and the low gradation sub-pixel electrode includes a first low gradation sub-pixel electrode disposed in the first sub-region, and a second low gradation sub-pixel electrode disposed in the second sub-region.

14 Claims, 29 Drawing Sheets

(56) References Cited

U.S. PATENT DOCUMENTS

2013/0321740 A1    12/2013    An et al.

FOREIGN PATENT DOCUMENTS

| KR | 10-2013-0025066 | 3/2013 |
| KR | 10-2013-0034360 | 4/2013 |
| KR | 10-2013-0125638 | 11/2013 |
| KR | 10-2015-0005000 | 1/2015 |

\* cited by examiner

LIQUID CRYSTAL DISPLAY

CROSS-REFERENCE TO RELATED APPLICATION

This application claims priority to and the benefit of Korean Patent Application No. 10-2014-0168658 filed in the Korean Intellectual Property Office on Nov. 28, 2014, the entire contents of which are incorporated herein by reference.

BACKGROUND (a) Field

The present inventive concept relates to a liquid crystal display.

(b) Description of the Related Art

A liquid crystal display, which is one of the most widely used displays, includes two sheets of display panels on which electric field generating electrodes such as a pixel electrode, a common electrode, and the like are formed, and a liquid crystal layer interposed therebetween. The liquid crystal display displays an image by applying a voltage to the electric field generating electrodes to generate an electric field on the liquid crystal layer and consequently, determining an orientation of liquid crystal molecules in the liquid crystal layer and controlling polarization of incident light.

As the liquid crystal display is used as a display of a television receiver, a size of a screen thereof is gradually increased. As the size of the liquid crystal display is increased as described above, differences in images according to view points of the viewer may be increased when a viewer views a central portion of the screen and both end portions of the screen.

In order to compensate for the difference in images according to viewpoints described above, the display may be formed in a curved type by bending it to a concave type or a convex type. The display may be a portrait type having a height which is longer than a width and bent in a vertical direction, and also be a landscape type having the height which is shorter than the width and bent in a horizontal direction, based on a viewer.

However, in the case in which the liquid crystal display is formed in the curved type by bending it, shear stress is applied to a substrate disposed inside the curve among two substrates. Therefore, a texture due to misalignment of upper and lower display panels may occur.

The above information disclosed in this Background section is only for enhancement of understanding of the background of the inventive concept and therefore it may contain information that does not form the prior art.

SUMMARY

The present inventive concept has been made in an effort to provide a curved type display having advantages of solving a decrease in transmittance and luminance which occurs in a display through shapes and arrangements of pixel electrodes and having improved quality, accordingly.

An exemplary embodiment of the present inventive concept provides a liquid crystal display including: a first insulating substrate; a gate line and a data line disposed on the first insulating substrate and intersecting with each other to be insulated from each other, a thin film transistor connected to the gate line and the data line, a pixel electrode connected to the thin film transistor and comprising a high gradation sub-pixel electrode and a low gradation sub-pixel electrode, and a second insulating substrate facing the first insulating substrate, wherein one pixel includes the thin film transistor and the pixel electrode and includes a first sub-region and a second sub-region which are separated by the gate line intervened therebetween, the high gradation sub-pixel electrode includes a first high gradation sub-pixel electrode disposed in the first sub-region, and a second high gradation sub-pixel electrode disposed in the second sub-region, and the low gradation sub-pixel electrode includes a first low gradation sub-pixel electrode disposed in the first sub-region, and a second low gradation sub-pixel electrode disposed in the second sub-region.

The first high gradation sub-pixel electrode and the second high gradation sub-pixel electrode may be connected to each other by a first connecting portion.

The first low gradation sub-pixel electrode and the second low gradation sub-pixel electrode may be connected to each other by a second connecting portion.

In a plurality of pixels which are adjacent to each other along a row direction, adjacent pixel electrodes have al line of symmetry.

In the first sub-region and the second sub-region, the high gradation sub-pixel electrode and the low gradation sub-pixel electrode which are adjacent to each other are spaced apart about 3 μm to about 10 μm.

The first sub-region and the second sub-region may have an area ratio of about 1:1.

The high gradation sub-pixel electrode may include a first horizontal stem portion, a first vertical stem portion vertically connected to one end of the first horizontal stem portion, and a first fine branch portion extending from the first horizontal stem portion and the first vertical stem portion, and the low gradation sub-pixel electrode may include a second horizontal stem portion, a second vertical stem portion vertically connected to one end of the second horizontal stem portion, and a second fine branch portion extending from the second horizontal stem portion and the second vertical stem portion.

The first connecting portion and the second vertical stem portion may be adjacent to each other to be parallel to each other.

The liquid crystal display may further include a voltage dividing reference voltage line disposed on the same layer as that of the data line, wherein the voltage dividing reference voltage line may overlaps end portions of the first vertical stem portion, the second vertical stem portion, the first fine branch portion, and the second fine branch portion.

In a plurality of pixels which are adjacent to each other along a column direction, the first and second vertical stem portions in adjacent pixels are symmetrical to each other in the column direction.

The first and second vertical stem portions which are each disposed in the first sub-region and the second sub-region are disposed on a same side of the pixel electrode.

The first and second vertical stem portions which are disposed in the first sub-region and the first and second vertical stem portions which are disposed in the second sub-region may be alternately disposed on a left side of the pixel electrode and the right side of the pixel electrode.

The liquid crystal display may further include the gate insulating layer disposed on a gate line, and a passivation layer disposed on the data line.

The liquid crystal display may be a curved type.

An exemplary embodiment of the present inventive concept provides a liquid crystal display including: a first insulating substrate, a gate line and a data line disposed on the first insulating substrate and intersecting with each other to be insulated from each other, a thin film transistor connected to the gate line and the data line, a pixel electrode connected to the thin film transistor and comprising a first sub-pixel region and a second sub-pixel region which are separated by the gate line intervened therebetween. Each of the first sub-pixel region and the second sub-pixel region include a high gradation sub-pixel electrode and a low gradation sub-pixel electrode.

Each of the high gradation sub-pixel electrode and the low gradation sub-pixel electrode may include a horizontal stem portion, a vertical stem portion vertically connected to one end of the first horizontal stem portion, and a fine branch portion extending in a diagonal direction from the horizontal stem portion and the vertical stem portion. Fine branch portions in the high gradation sub-pixel electrode and the low gradation sub-pixel electrode may extend substantially perpendicular to each other.

The pixel electrode may further include a connecting portion connection the high gradation sub-pixel electrode in the first subpixel region and the high gradation sub-pixel electrode in the second subpixel region. The connection portion may be disposed adjacent to the vertical stem portion of the low gradation sub-pixel electrode and extends in a direction substantially parallel to the vertical stem portion of the low gradation sub-pixel electrode.

According to an embodiment of the present inventive concept, the display capable of controlling the occurrence of the texture caused by the misalignment of the upper and lower display panels and having improved luminance and transmittance even in the case in which the display is bent may be provided.

DETAILED DESCRIPTION OF THE EMBODIMENTS

In the following detailed description, the present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

Figure 1:
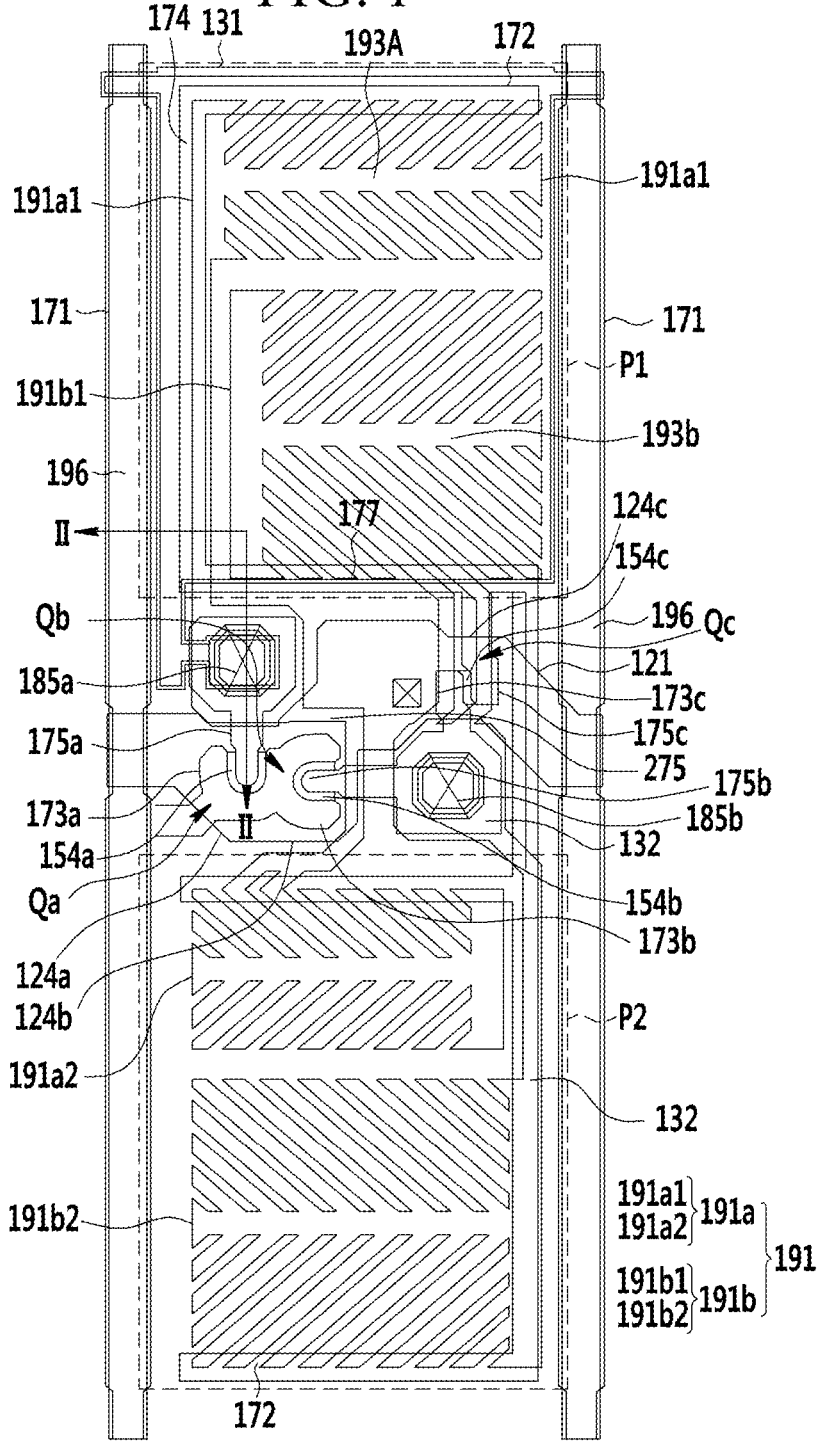
FIG. 1 is a plan view of one pixel according to an exemplary embodiment of the present inventive concept.
Figure 3:
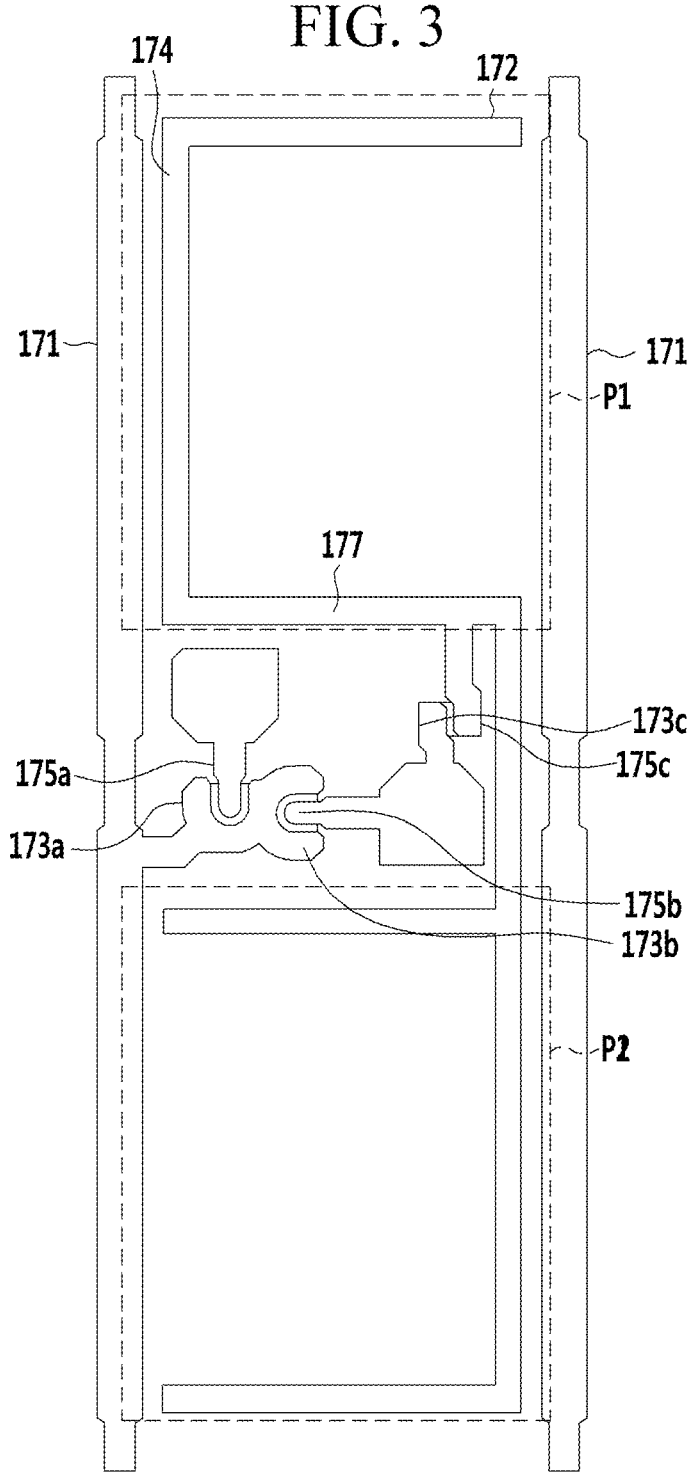
FIG. 3 is a plan view of a data conductor layer according to an exemplary embodiment of the present inventive concept.
Figure 4:
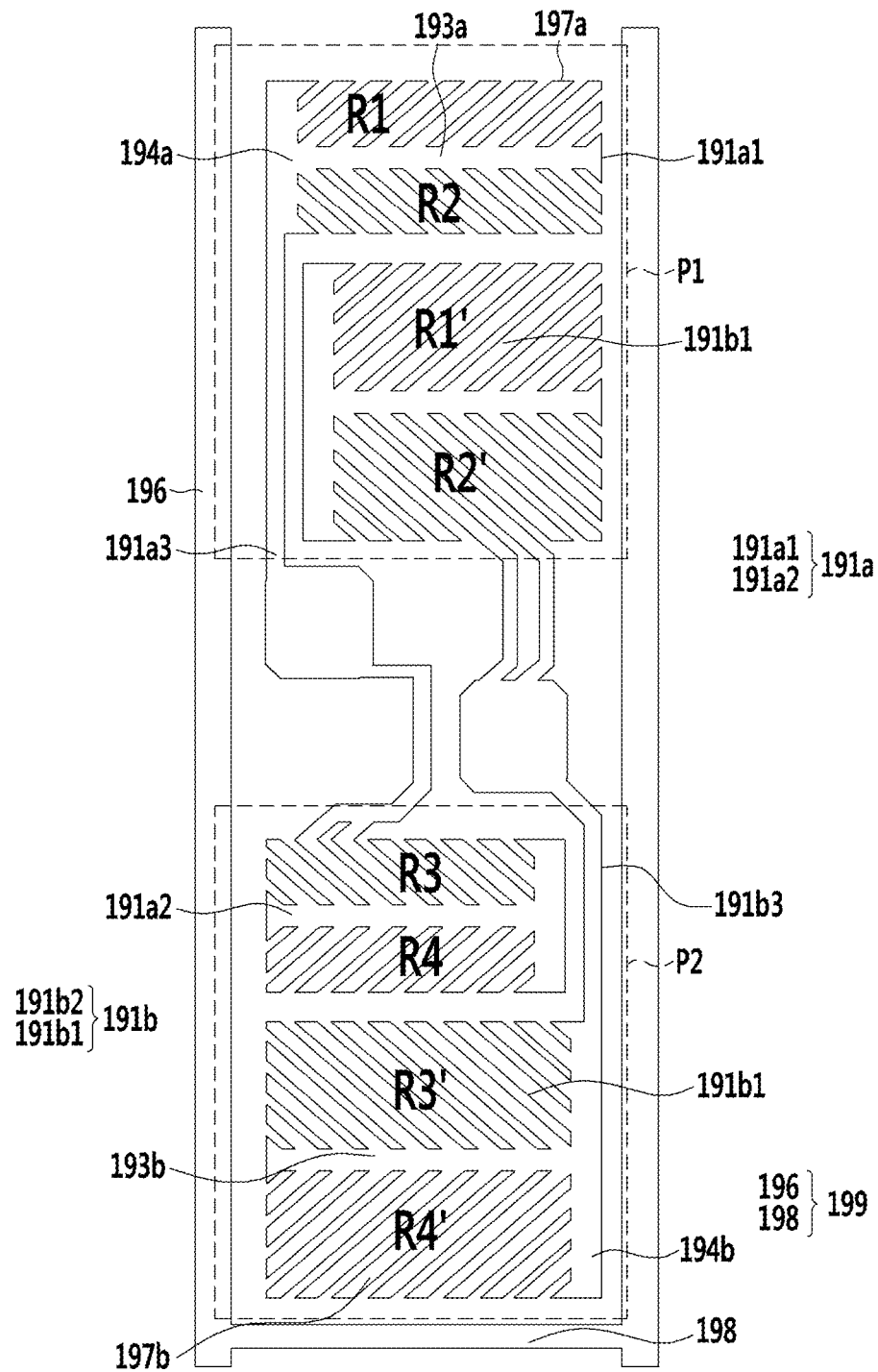
FIG. 4 is a plan view of a pixel electrode layer according to an exemplary embodiment of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present. Hereinafter, a liquid crystal display according to an exemplary embodiment of the present inventive concept will be described with reference to FIGS. 1 to 4. FIG. 1 is a plan view of one pixel according to an exemplary embodiment of the present inventive concept, FIG. 2 is a cross-sectional view taken along line II-II of FIG. 1, FIG. 3 is a plan view of a data conductor layer according to an exemplary embodiment of the present inventive concept, and FIG. 4 is a plan view of a pixel electrode layer according to an exemplary embodiment of the present inventive concept.

Figure 2:
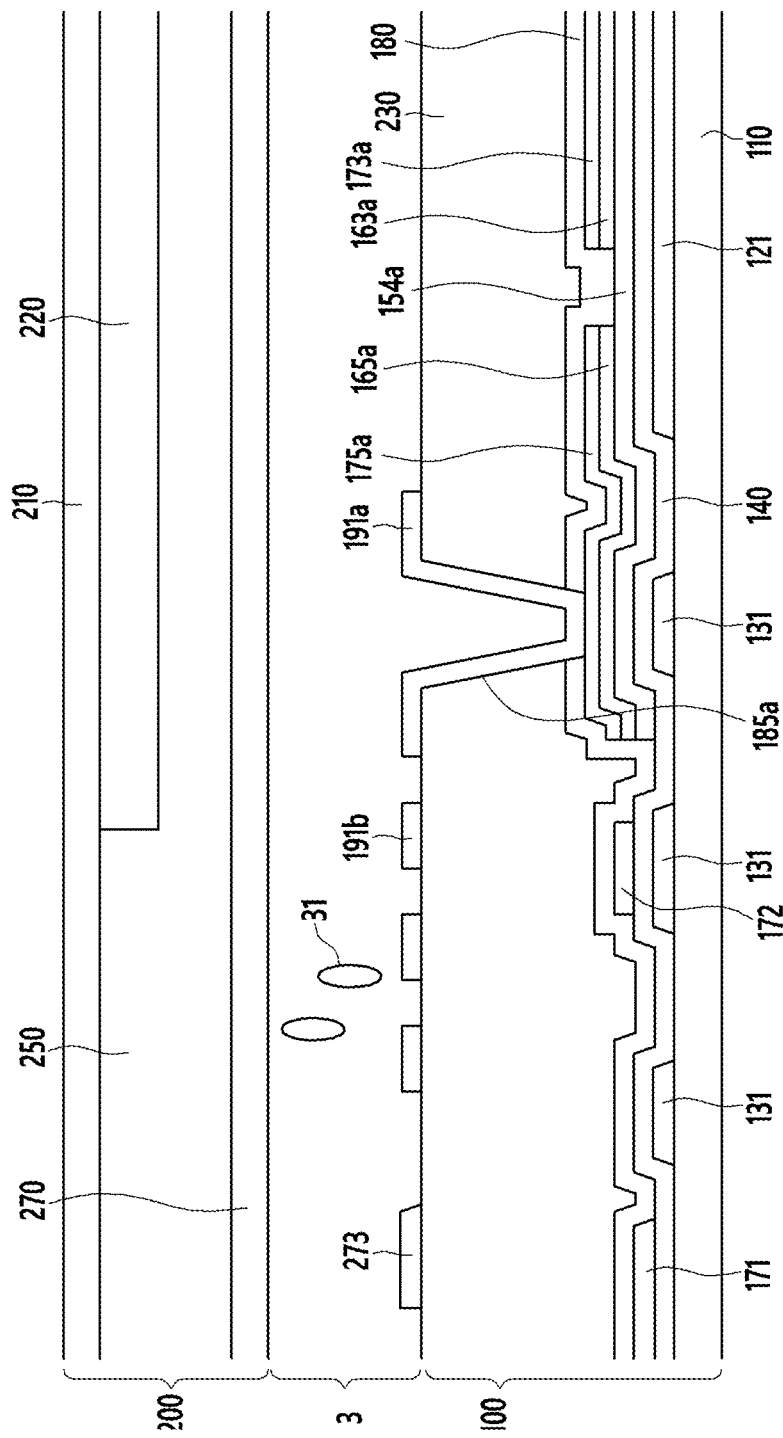
FIG. 2 is a cross-sectional view taken along line II-II of FIG. 1.

First, referring to FIGS. 1 and 2, a gate conductor including a gate line 121 and light blocking layers 131 and 132 is disposed on a first insulating substrate 110 made of transparent glass, plastic, or the like.

The gate line 121 includes gate electrodes 124a, 124b, and 124c, and a wide end portion (not shown) for allowing a connection with other layers or external driving circuits.

The gate line 121 and the light blocking layers 131 and 132 may be made of an aluminum (Al) based metal such as aluminum, an aluminum alloy, or the like, a silver (Ag) based metal such as silver, a silver alloy, or the like, a copper (Cu) based metal such as copper, a copper alloy, or the like, a molybdenum (Mo) based metal such as molybdenum, a molybdenum alloy, or the like, chromium (Cr), tantalum (Ta), titanium (Ti), and the like. The gate line 121 and the light blocking layers 131 and 132 may have a multilayer structure including at least two conductive layers having different physical properties.

The gate line 121 may traverse one pixel along a row direction and particularly, traverse a center of one pixel. The one pixel includes a pixel electrode including a first sub-region and a second sub-region which are separated by the gate line 121 intervened therebetween. Each of the first sub-region and the second sub-region includes a high gradation sub-pixel electrode and a low gradation sub-pixel region. A first high gradation sub-pixel electrode 191a1 indicating a high gradation and a first low gradation sub-pixel electrode 191b1 indicating a low gradation may be disposed in a first sub-region P1 which refers to an upper side of the gate line 121, and a second high gradation sub-pixel electrode 191a2 indicating the high gradation and a second low gradation sub-pixel electrode 191b2 indicating the low gradation may be disposed in a second sub-region P2 which refers to a lower side of the gate line 121, or vice versa.

The light blocking layers 131 and 132 may be made of the same material as that of the gate line 121 and may be formed by a simultaneous process with the gate line 121.

The light blocking layers 131 and 132 include a plurality of horizontal portions and a plurality of vertical portions connecting the plurality of horizontal portions at edges thereof. The plurality of horizontal portions and the plurality of vertical portions may have the same plan shape as that of a voltage dividing reference voltage line 172 or a data line 171 to be described below. This is to prevent light from being introduced into a semiconductor layer disposed on the data line 171 or the voltage dividing reference voltage line 172.

Although the present specification describes and shows the shapes of the light blocking layers 131 and 132 as described above, the shapes of the light blocking layers 131 and 132 are not limited thereto. For example, the light blocking layers 131 and 132 may also have any shape for performing the same function.

A gate insulating layer 140 is disposed on the gate conductor. A first semiconductor layer 154a, a second semiconductor layer 154b, and a third semiconductor layer 154c are disposed on the gate insulating layer 140.

A plurality of ohmic contacts 163a and 165a are disposed on the first, second, and third semiconductor layers 154a, 154b, and 154c, and may be omitted in the case in which the semiconductor layers 154a, 154b, and 154c are made of an oxide semiconductor material.

The data conductor including the data line 171 including source electrodes 173a, 173b, and 173c, drain electrodes 175a, 175b, and 175c, and the voltage dividing reference voltage line 172 is formed on the ohmic contacts 163a and 165a and the gate insulating layer 140.

The data conductor, the ohmic contacts, and the semiconductor layers disposed therebelow may be simultaneously formed using one mask. According to the above-mentioned process, a lower display panel is formed using four masks.

FIG. 3 shows a plan view of a data conductor layer according to an exemplary embodiment of the present inventive concept.

The data conductor includes the data line 171, the first source electrode 173a, the second source electrode 173b, the third source electrode 173c, the first drain electrode 175a, the second drain electrode 175b, the third drain electrode 175c, and the voltage dividing reference voltage line 172.

The data line 171 extends in a column direction along an edge of one pixel region and includes the first source electrode 173a and the second source electrode 173b. The first source electrode 173a and the second source electrode 173b may have a U shape, but are not limited thereto.

The first drain electrode 175a faces the first source electrode 173a, includes an I shaped portion opposite to the first source electrode 173a having a U shape by way of example, and has a wide expanded region connected to a first sub-pixel electrode 191a.

The second drain electrode 175b also faces the second source electrode 173b, includes an I shaped portion opposite to the second source electrode 173b having a U shape by way of example, and has a wide expanded region connected to a second sub-pixel electrode 191b.

The third source electrode 173c is formed to extend from one surface of the second drain electrode 175b.

In addition, the data conductor includes the voltage dividing reference voltage line 172, wherein the voltage dividing reference voltage line 172 includes the third drain electrode 175c forming a thin film transistor together with the third source electrode 173c.

Referring to FIGS. 3 and 4, the voltage dividing reference voltage line 172 includes a plurality of horizontal portions and a plurality of vertical portions connecting the plurality of horizontal portions. The voltage dividing reference voltage line 172 includes a plurality of horizontal portions 177 and a plurality of vertical portions 174 connecting the plurality of horizontal portions 177, so that the vertical portions may be connected to one end of the horizontal portions which are parallel to each other.

The voltage dividing reference voltage line 172 may include two horizontal portions 177 and one vertical portion 174 which are disposed in the first sub-region P1 and the second sub-region P2, respectively. One vertical portion 174 may be connected to one end of the two horizontal portions 177. This is an arrangement depending on the shape of the pixel electrode 191 and as the shape of the pixel electrode 191 is changed, the shape of the voltage dividing reference voltage line 172 may also be changed. Specifically, the voltage dividing reference voltage line 172 is partially overlapping ends of a first vertical stem portion 194a, a second vertical stem portion 194b, a first fine branch portion 197a, and a second fine branch portion 197b in the first sub-region P1. In addition, the voltage dividing reference voltage line 172 is also partially overlapping ends of the first vertical stem portion 194a, the second vertical stem portion 194b, the first fine branch portion 197a, and the second fine branch portion 197b in the second sub-region P2.

Meanwhile, in the voltage dividing reference voltage line 172 disposed in the first sub-region P1, a portion of the horizontal portion 177 which is disposed at the lowest portion is branched downwardly to form the third drain electrode 175c.

The first gate electrode 124a, the first source electrode 173a, and the first drain electrode 175a as described above form a first thin film transistor (TFT) Qa together with the first semiconductor layer 154a, and a channel of the thin film transistor is formed in the first semiconductor layer 154a between the first source electrode 173a and the first drain electrode 175a. Similarly, the second gate electrode 124b, the second source electrode 173b, and the second drain electrode 175b form a second thin film transistor Qb together with the second semiconductor layer 154b, a channel of the thin film transistor is formed in the second semiconductor layer 154b between the second source electrode 173b and the second drain electrode 175b, the third gate electrode 124c, the third source electrode 173c, and the third drain electrode 175c form a third thin film transistor Qc together with the third semiconductor layer 154c, and a channel of the thin film transistor is formed in the semiconductor layer 154c between the third source electrode 173c and the third drain electrode 175c.

A passivation layer 180 is disposed on the data conductor and the exposed semiconductor layers 154a, 154b, and 154c.

The passivation layer 180 may be formed of an inorganic insulating layer material such as silicon nitride, silicon oxide, or the like. In the case in which a color filter is disposed on the lower display panel, the passivation layer 180 prevents pigment of the color filter from being introduced into the exposed semiconductor layers 154a, 154b, and 154c.

The color filter 230 may be disposed on the passivation layer 180 and may uniquely display one of primary colors, wherein examples of the primary colors may include the primary colors such as red, green, blue, yellow, cyan, and magenta, and the like. Although not shown, the color filter may further include a color filter displaying a mixed color of the primary colors or white, in addition to the primary colors.

A first contact hole 185a and a second contact hole 185b that expose the first drain electrode 175a and the second drain electrode 175b are disposed in the passivation layer 180 and the color filter 230.

The pixel electrode 191 is disposed on the color filter 230. The pixel electrode 191 includes the first high gradation sub-pixel electrode 191a1 applied with a high gradation voltage and a second low gradation sub-pixel electrode 191b1 applied with a low gradation voltage.

The pixel electrode 191 may be made of a transparent material such as an ITO, an IZO, or the like. The pixel electrode 191 may also be made of a transparent conductive material such as an ITO, an IZO, or the like, or a reflective metal such as aluminum, silver, chromium, or an alloy thereof.

A shielding electrode 199 which is made of the same material as that of the pixel electrode 191 is disposed on the same layer as the pixel electrode 191 on the color filter 230. The pixel electrode 191 and the shielding electrode 199 may be simultaneously formed by the same process.

The pixel electrode 191 and the shield electrode 199 according to an exemplary embodiment of the present inventive concept will be described with reference to FIG. 4.

First, the pixel electrode 191 includes the high gradation sub-pixel electrode 191a and the low gradation sub-pixel electrode 191b as described above. The high gradation sub-pixel electrode 191a includes the first high gradation sub-pixel electrode 191a1 disposed in the first sub-region P1 and the second high gradation sub-pixel electrode 191a2 disposed in the second sub-region P2. In addition, the low gradation sub-pixel electrode 191b includes the first low gradation sub-pixel electrode 191b1 disposed in the first sub-region P1 and the second low gradation sub-pixel electrode 191b2 disposed in the second sub-region P2. That is, the first high gradation sub-pixel electrode 191a1 and the first low gradation sub-pixel electrode 191b1 are disposed in the first sub-region P1 and the second high gradation sub-pixel electrode 191a2 and the second low gradation sub-pixel electrode 191b2 are disposed in the second sub-region P2.

In this case, a unit region overlapping a first sub-region P1 and a second sub-region P2 and having a liquid crystal molecule 31 arranged in a predetermined direction is referred to as one pixel. An area ratio of the first sub-region P1 and the second sub-region P2 which are included in one pixel may be about 1:1. The reason is that the respective sub-regions include one high gradation sub-pixel electrode and one low gradation sub-pixel electrode.

In addition, the high gradation sub-pixel electrodes, 191a1 and 191a2, and the low gradation sub-pixel electrodes, 191b1 and 191b2, which are disposed in the respective sub-regions may be spaced apart about 3 μm to 10 μm. That is, a distance between an end of the first fine branch portion 197a and an end of the second fine branch portion 197b which are disposed in the first sub-region P1 or the second sub-region P2 may be about 3 μm to 10 μm. According to the above-mentioned distance, since the spaced distance between the sub-pixel electrodes which are disposed to be adjacent to each other in one sub-region is reduced, transmittance of the display may be improved.

The high gradation sub-pixel electrode 191a includes a first horizontal stem portion 193a extending in a row direction, a first vertical stem portion 194a vertically connected to one end of the first horizontal stem portion 193a and extending in a column direction, and a plurality of first fine branch portions 197a extending in a diagonal direction from both sides of the first horizontal stem portion 193a. The high gradation sub-pixel electrode 191a includes the first and second high gradation sub-pixel electrodes 191a1 and 191a2. That is, the first and second high gradation sub-pixel electrodes 191a1 and 191a2 each include the first horizontal stem portion 193a, the first vertical stem portion 194a, and the first fine branch portion 197a which are described above.

According to an exemplary embodiment of the present inventive concept, the first and second high gradation sub-pixel electrodes 191a1 and 191a2 each include a first horizontal stem portion 193a and each include two regions having different arrangements of the liquid crystal molecule 31 and separated by the first horizontal stem portion 193a. By way of example, referring to FIG. 4, the liquid crystal molecule 31 disposed in a region R1 over the first horizontal stem portion 193a disposed in the first sub-region P1 is arranged in a left-downward direction, and the liquid crystal molecule 31 disposed in a region R2 below the first horizontal stem portion 193a disposed in the first sub-region P1 is arranged in a left-upward direction.

In addition, the liquid crystal molecule 31 disposed in a region R3 over the first horizontal stem portion 193a disposed in the second sub-region P2 is arranged in a right-downward direction, and the liquid crystal molecule 31 disposed in a region R4 below the first horizontal stem portion 193a disposed in the second sub-region P2 is arranged in a right-upward direction.

The first high gradation sub-pixel electrode 191a1 included in one pixel includes a plurality of regions R1, R2, R3, and R4 which are separated by the first horizontal stem portion 193a and the first vertical stem portion 194a. The first horizontal stem portion 193a and the first vertical stem portion 194a form boundaries between neighboring regions R1, R2, R3, and R4.

The plurality of first fine branch portions 197a which are disposed in the respective regions R1, R2, R3, and R4 may extend in different directions. Particularly, the first fine branch portions 197a in the neighboring regions R1 and R2 or R3 and R4 may extend substantially perpendicular to each other to form an angle of about 90°. Particularly, extending directions to which the first fine branch portions 197a in the respective regions R1, R2, R3, and R4 may be same.

A fine slit from which the electrode is removed is disposed between the first fine branch portions 197a which are adjacent to each other.

An acute angle formed by the first fine branch portion 197a and the first horizontal stem portion 193a may be about 40° to 45°, but is not limited thereto. The above-mentioned acute angle may be appropriately adjusted taking into account display characteristics such as visibility and the like of the liquid crystal display.

FIG. 4 and the foregoing description describe an exemplary embodiment in which the first vertical stem portion 194a disposed in the first sub-region P1 is disposed on the left of one pixel and the first vertical stem portion 194a disposed in the second sub-region P2 is disposed on the right of the one pixel, but the present inventive concept is not limited thereto and the right and the left may be exchanged with each other as well.

According to an exemplary embodiment of the present inventive concept, the first high gradation sub-pixel electrode 191a1 disposed in the first sub-region P1 and the second high gradation sub-pixel electrode 191a2 disposed in the second sub-region P2 may be physically and electrically connected to each other by a first connecting portion 191a3.

A portion of the first connecting portion 191a3 extend to form a wide region and is consequently supplied with a voltage from the first drain electrode 175a which is exposed by the first contact hole 185a.

The low gradation sub-pixel electrode 191b includes a second horizontal stem portion 193b extending in a row direction, a second vertical stem portion 194b vertically connected to one end of the second horizontal stem portion 193b and extending in a column direction, and a plurality of second fine branch portions 197b extending in a diagonal direction from both sides of the second horizontal stem portion 193b. The low gradation sub-pixel electrode 191b includes the first and second low gradation sub-pixel electrodes 191b1 and 191b2. That is, the first and second low gradation sub-pixel electrodes 191b1 and 191b2 each include the second horizontal stem portion 193b, the second vertical stem portion 194b, and the second fine branch portion 197b.

According to an exemplary embodiment of the present inventive concept, the first and second low gradation sub-pixel electrodes 191b1 and 191b2 each include a second horizontal stem portion 193b and include two regions having different arrangements of the liquid crystal molecule 31 and separated by the second horizontal stem portion 193b. By way of example, referring to FIG. 4, the liquid crystal molecule 31 disposed in a region R1' over the second horizontal stem portion 193b disposed in the first sub-region P1 is arranged in a left-downward direction, and the liquid crystal molecule 31 disposed in a region R2' below the second horizontal stem portion 193b disposed in the first sub-region P1 is arranged in a left-upward direction.

In addition, the liquid crystal molecule 31 disposed in a region R3' over the second horizontal stem portion 193b disposed in the second sub-region P2 is arranged in a right-downward direction, and the liquid crystal molecule 31 disposed in a region R4' below the second horizontal stem portion 193b disposed in the second sub-region P2 is arranged in a right-upward direction.

The first low gradation sub-pixel electrode 191b1 included in one pixel includes a plurality of regions R1', R2', R3', and R4' which are separated by the second horizontal stem portion 193b and the second vertical stem portion 194b. The second horizontal stem portion 193b and the second vertical stem portion 194b form boundaries between neighboring regions R1', R2', R3', and R4'.

The plurality of fine branch portions 197b which are disposed in the respective regions R1', R2', R3', and R4' may extend in different directions. Particularly, the fine branch portions 197b in the neighboring regions R1' and R2' or R3' and R4' may form about 90°. Extending directions to which the fine branch portions 197b in the respective regions R1', R2', R3', and R4' may be same.

A fine slit from which the electrode is removed is disposed between the second fine branch portions 197b which are adjacent to each other.

An acute angle formed by the second fine branch portion 197b and the second horizontal stem portion 193b may be about 40° to 45°, but is not limited thereto. The above-mentioned acute angle may be appropriately adjusted taking into account display characteristics such as visibility and the like of the liquid crystal display.

FIG. 4 and the foregoing description describe an exemplary embodiment in which the second vertical stem portion 194b disposed in the first sub-region P1 is disposed on the left of one pixel and the second vertical stem portion 194b disposed in the second sub-region P2 is disposed on the right of the one pixel, but the present inventive concept is not limited thereto and the right and the left may be exchanged with each other as well.

According to an exemplary embodiment of the present inventive concept, the first low gradation sub-pixel electrode 191b1 disposed in the first sub-region P1 and the second low gradation sub-pixel electrode 191b2 disposed in the second sub-region P2 may be physically and electrically connected to each other by a second connecting portion 191b3.

A portion of the second connecting portion 191b3 extends to form a wide region and is consequently supplied with a voltage from the second drain electrode 175b which is exposed by the second contact hole 185b.

Meanwhile, the first vertical stem portion 194a and the second vertical stem portion 194b which are disposed in the first sub-region P1 may be disposed on a same side of the pixel electrode. For example, in the case in which the first vertical stem portion 194a is connected to a left end of the first horizontal stem portion 193a, the second vertical stem portion 194b may also be connected to a left end of the second horizontal stem portion 193b.

The first vertical stem portion 194a and the second vertical stem portion 194b which are disposed in the second sub-region P2 may also be disposed on a same side of the pixel electrode. For example, in the case in which the first vertical stem portion 194a is connected to a right end of the first horizontal stem portion 193a, the second vertical stem portion 194b may also be connected to a right end of the second horizontal stem portion 193b.

In this case, connected positions of the first and second vertical stem portions which are disposed in the first sub-region P1 are different from connected positions of the first and second vertical stem portions which are disposed in the second sub-region P2. That is, in the case in which the first and second vertical stem portions 194a and 194b which are disposed in the first sub-region P1 are connected to the left end of the horizontal stem portion, the first and second vertical stem portions 194a and 194b which are disposed in the second sub-region P2 are connected to the right end of the horizontal stem portion. In other words, the first and second vertical stem portions 194a and 194b which are disposed in the first sub-region P1 and the first and second vertical stem portions 194a and 194b which are disposed in the second sub-region P2 are alternately disposed on the left side of the pixel electrode and the right side of the pixel electrode.

In addition, the first connecting portion 191a3 connecting the first high gradation sub-pixel electrode 191a1 and the second high gradation sub-pixel electrode 191a2 to each other is disposed to be adjacent to the second vertical stem portion 194b of the first low gradation sub-pixel electrode 191b1, and may be particularly disposed to be parallel to the second vertical stem portion 194b of the first low gradation sub-pixel electrode 191b1.

Thereby, the liquid crystal molecules 31 which are arranged by the first low gradation sub-pixel electrode 191b1 applied with a low gradation are easily arranged by a high gradation voltage of the first connecting portion 191a3 which is applied with a high gradation and is disposed to be adjacent to the second vertical stem portion 194b of the first low gradation sub-pixel electrode 191b1. Therefore, a texture of the display may be suppressed and transmittance thereof may be improved.

According to those described above, the high gradation sub-pixel electrode 191a and the low gradation sub-pixel electrode 191b are each connected to the first drain electrode 175a or the second drain electrode 175b through the first contact hole 185a and the second contact hole 185b, and are applied with a data voltage from the first drain electrode 175a and the second drain electrode 175b.

The shielding electrode 199 is disposed so as to overlap the data line 171 at the edge of one pixel. The shielding electrode 199 includes a vertical portion 196 which extends along the data line 171, and one or more horizontal portions 198 connecting the neighboring vertical portions 196 to each other.

The shield electrode 199 is applied with the same voltage as a common electrode (not shown). Therefore, an electric field does not occur between the shield electrode 199 and the common electrode and the liquid crystal molecules disposed between the shield electrode 199 and the common electrode are not altered and remain unchanged. Therefore, a liquid crystal between the shield electrode 199 and the common electrode 270 becomes a black state. As such, the liquid crystal molecule itself may serve as a light blocking member. Therefore, in the display according to an exemplary embodiment of the present inventive concept, the light blocking member which is disposed on the second insulating substrate and extending in the row direction may be omitted.

Next, the upper display panel 200 will be described.

A light blocking member 220 is disposed on the second insulating substrate 210 which is made of transparent glass, plastic, or the like and faces the first insulating substrate 110. The light blocking member 220 may also be called a black matrix and may prevent light leakage.

The light blocking member 220 according to an exemplary embodiment of the present inventive concept may extend in one direction along the gate line 121.

In the case in which the color filter is disposed on the lower display panel 100, the color filter on the upper display panel 200 may be omitted, but is not limited thereto. For example, the color filter may be disposed on the second insulating substrate 210. On the contrary, the light blocking member 220 which is disposed on the second insulating substrate 210 according to an exemplary embodiment of the present inventive concept may also be disposed on the first insulating substrate 110.

An overcoat layer 250 is disposed on the light blocking member 220. The overcoat layer 250 may be made of an (organic) insulating material, prevent the light blocking member 220 from being exposed, and provide a flat surface. The overcoat layer 250 may be omitted.

The common electrode 270 is disposed on the overcoat layer 250. The common electrode 270, which may be made of the same material as the pixel electrode 191, is formed in a flat surface formed by the overcoat layer 250 and is applied with a common voltage.

In addition, an alignment layer (not shown) may be disposed on the pixel electrode 191 and the common electrode 270.

A liquid crystal layer 3 is disposed between the lower display panel 100 and the upper display panel 200. The liquid crystal layer 3 has negative dielectric anisotropy, and liquid crystal molecules 31 of the liquid crystal layer 3 are aligned so that major axes thereof are perpendicular to surfaces of the two display panels 100 and 200 in a state in which an electric field is not present.

The high gradation sub-pixel electrode 191a and the low gradation sub-pixel electrode 191b to which the data voltage is applied generate the electrical field together with the common electrode 270 of the upper display panel 200 to thereby determine an alignment direction of the liquid crystal molecule of the liquid crystal layer 3 disposed between the two electrodes 191 and 270. Luminance of light passing through the liquid crystal layer 3 is controlled depending on the direction of the liquid crystal molecule determined as described above.

According to the exemplary embodiments as described above, since the respective sub-regions P1 and P2 included in one pixel include both the high gradation pixel electrode and the low gradation pixel electrode, improved transmittance and display quality may be provided. In addition, by the pixel electrode including the horizontal stem, the texture caused by the misalignment of the upper and lower display panels may also be controlled.

Figure 5:
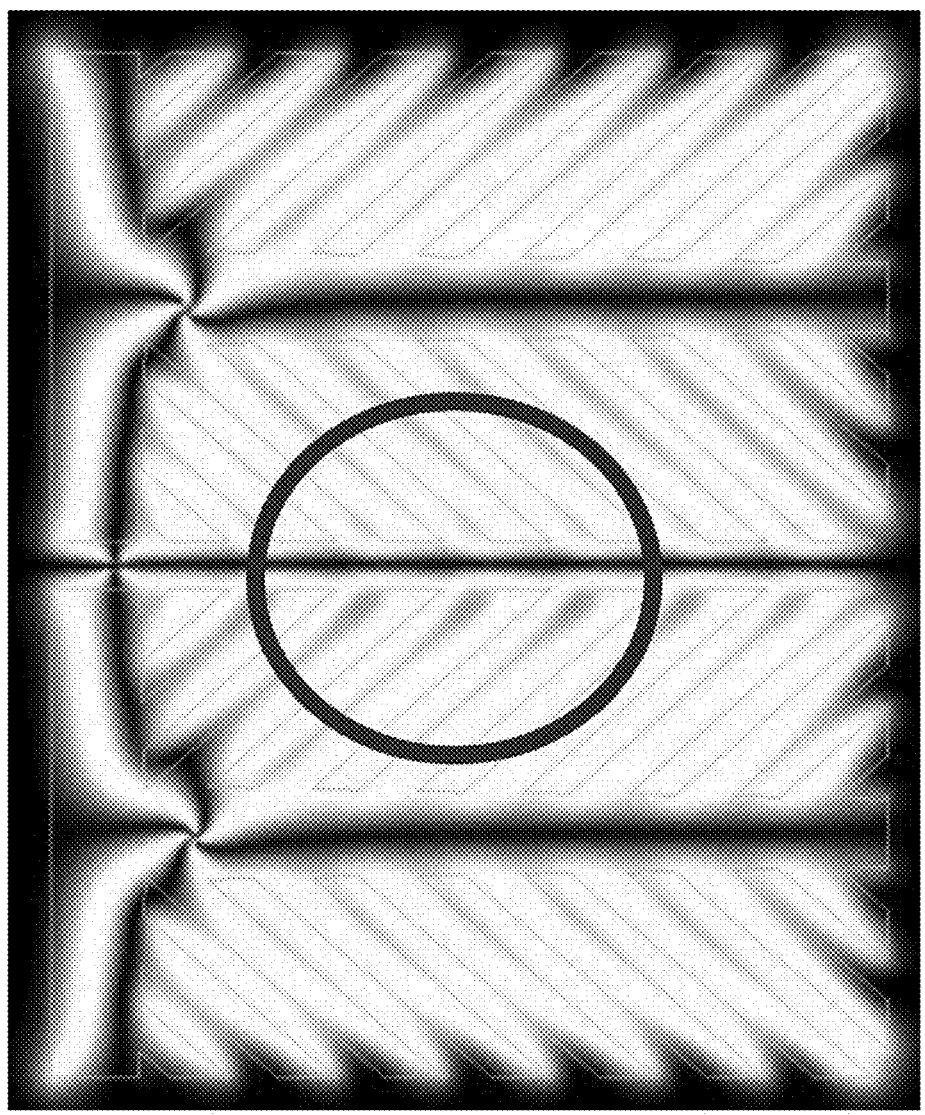
FIG. 5 is an image of some pixel according to an exemplary embodiment of the present inventive concept and FIG. 6 is an image of some pixel according to comparative example.
Figure 6:
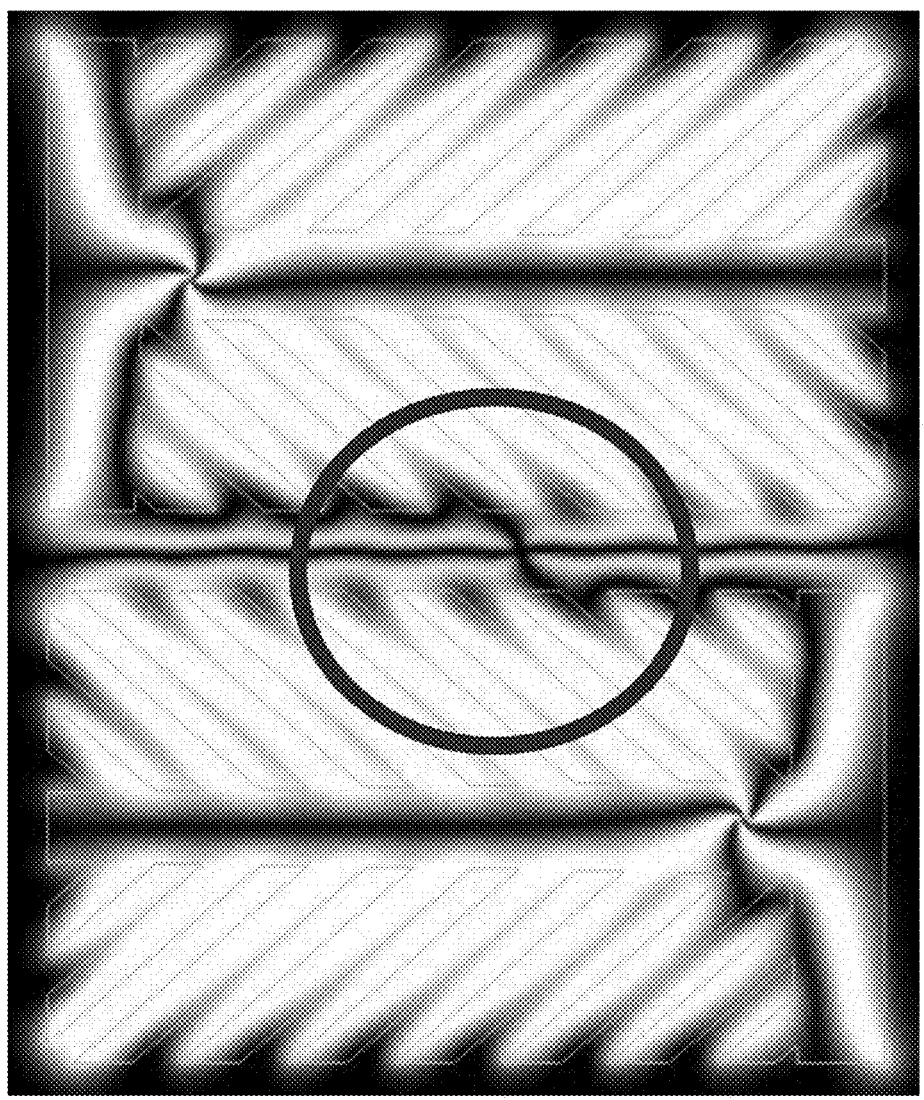
Figure 7:
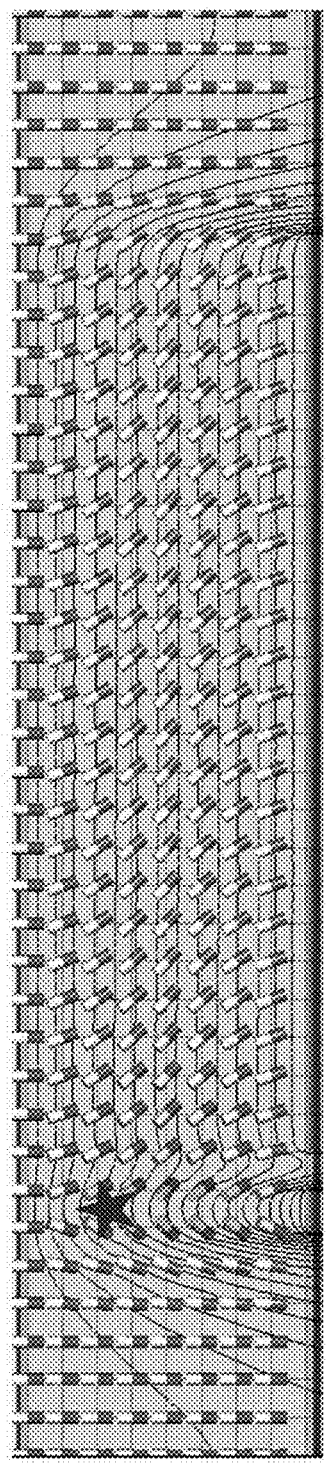
FIG. 7 is an image of some pixel according to an exemplary embodiment of the present inventive concept and FIG. 8 is an image of some pixel according to comparative example.
Figure 8:
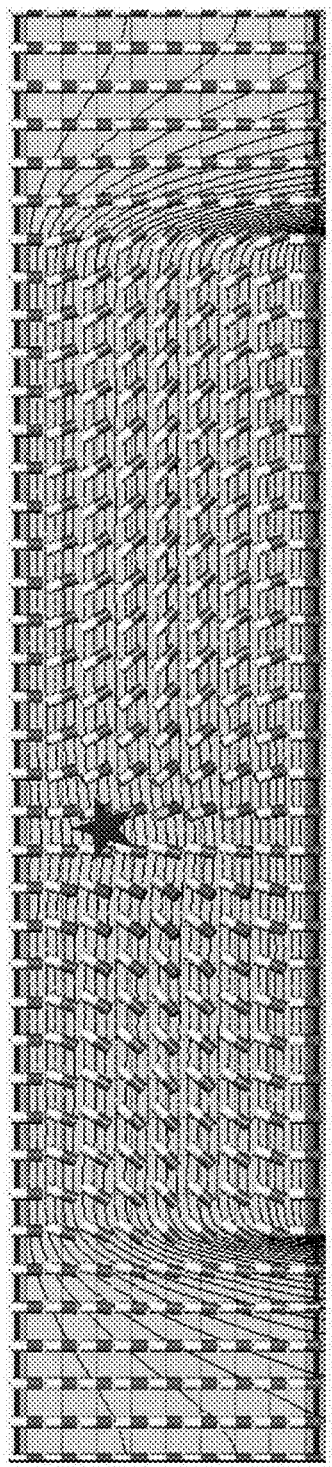

Hereinafter, effects of exemplary embodiments of the present inventive concept will be described with reference to FIGS. 5 to 15. FIG. 5 is an image of some pixel according to an exemplary embodiment of the present inventive concept, FIG. 6 is an image of some pixel according to comparative example, FIG. 7 is an image of some pixel according to an exemplary embodiment of the present inventive concept, and FIG. 8 is an image of some pixel according to comparative example. FIGS. 9A to 14B are texture expression images of pixel regions according to an exemplary embodiment of the present inventive concept and comparative example and FIG. 15 is a transmittance graph for an exemplary embodiment of the present inventive concept and comparative example.

First, referring to FIGS. 5 and 6, FIG. 5 is a transmission image for one sub-region according an exemplary embodiment of the present inventive concept and FIG. 6 is a transmission image for comparative example in which only a high gradation pixel electrode or a low gradation pixel electrode is disposed in one sub-region.

Referring to FIG. 5, according to one exemplary embodiment of the present inventive concept, transmittance of one pixel shows about 106.17% and a distance between the high gradation pixel electrode and the low gradation pixel electrode is also decreased, such that a transmittance of the liquid crystal molecule is increased.

On the other hand, referring to FIG. 6, according to the comparative example, transmittance of one pixel shows about 100% and significant texture occurs at the boundary between the pixel electrodes. To eliminate texture, the above mentioned spaced distance has to be increased in the comparative example, thus, transmittance may be decreased. When the spaced distance is decreased in the comparative example, a large amount of texture may be occurred because a distance in which the liquid crystal molecule rotates is not sufficiently secured.

Next, referring to FIG. 7, according to an exemplary embodiment of the present inventive concept, an arrangement of liquid crystal molecules is also sequentially controlled by the vertical stem portion disposed at the edge of one pixel and the liquid crystal molecules, thus, the liquid crystal molecules are stably arranged. This is due to the connecting portion of the high gradation sub-pixel electrode which is disposed to be adjacent to the vertical stem portion of the low gradation pixel electrode, as described above. However, according to the comparative example shown in FIG. 8, collision between neighboring liquid crystal molecules occurs and a number of textures occur in one pixel.

That is, according to FIGS. 5 to 8, it has been confirmed that the pixel electrode according an exemplary embodiment of the present inventive concept may improve transmittance and eliminate the texture.

Next, FIGS. 9A to 14B are images of the texture and transmittance according to a misalignment of the upper and lower display panels for an exemplary embodiment of the present inventive concept and comparative example, from a 120 gray gradation and a 255 gray gradation.

Figure 9A:
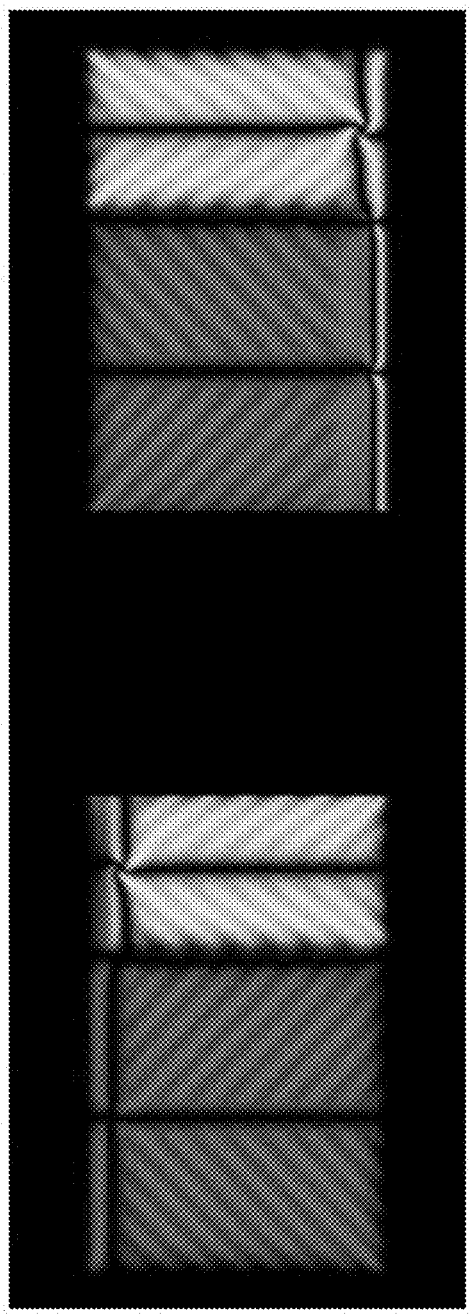
FIGS. 9A, 9B, 10A, 10B, 11A, 11B, 12A, 12B, 13A, 13B, 14A and 14B are texture expression images of pixel regions according to an exemplary embodiment of the present inventive concept and comparative example.
Figure 9B:
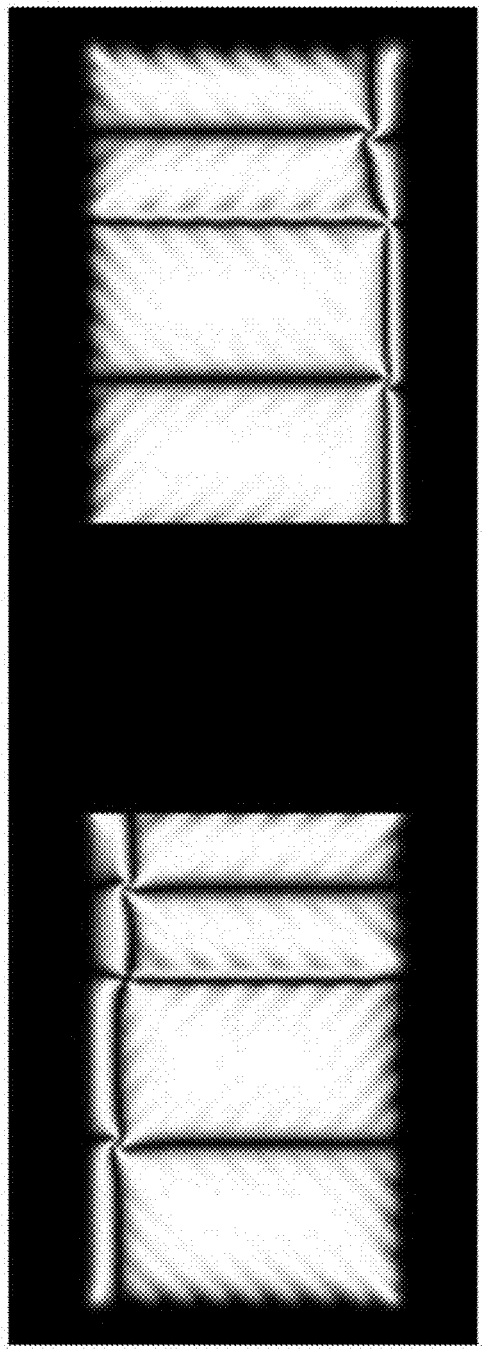
Figure 10A:
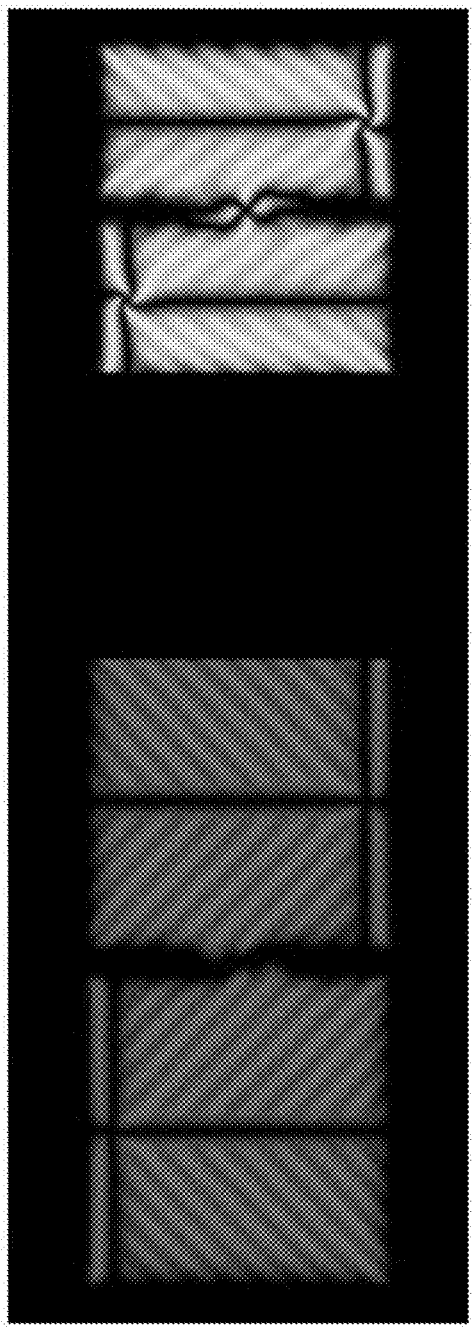
Figure 10B:
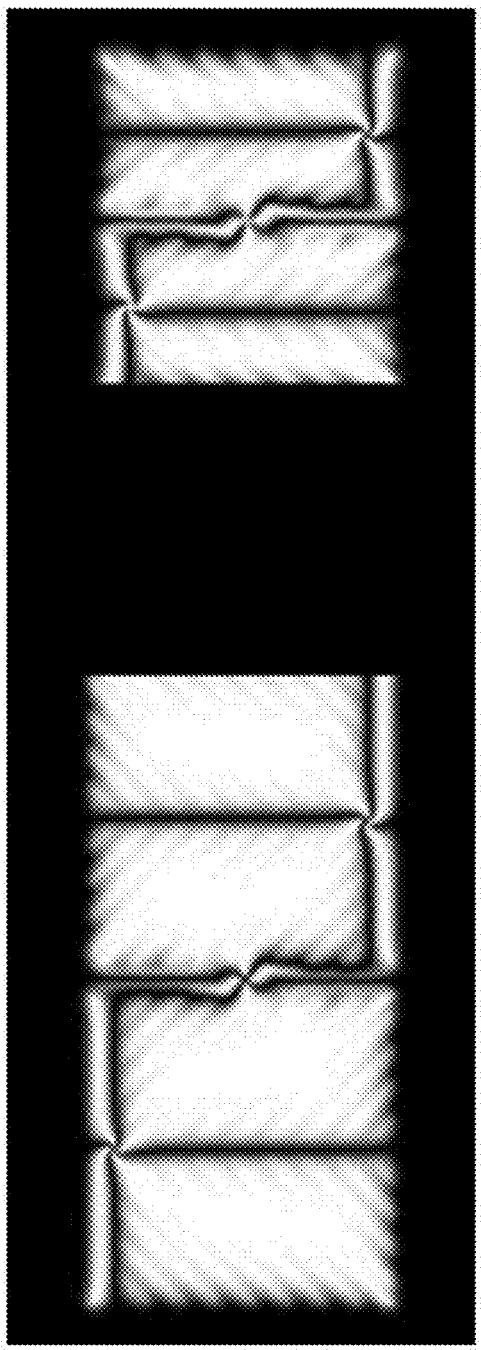
Figure 11A:
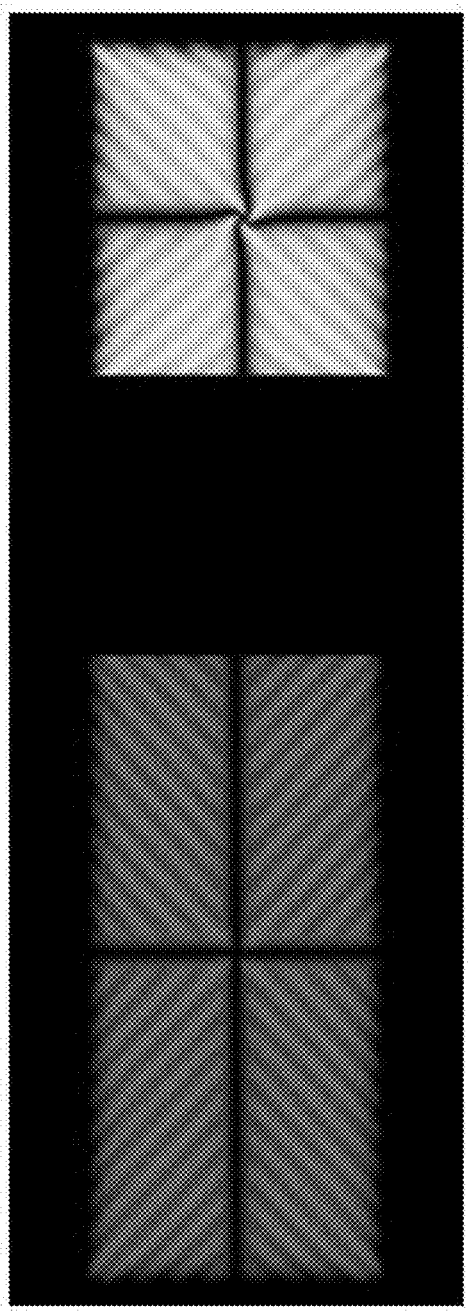
Figure 11B:
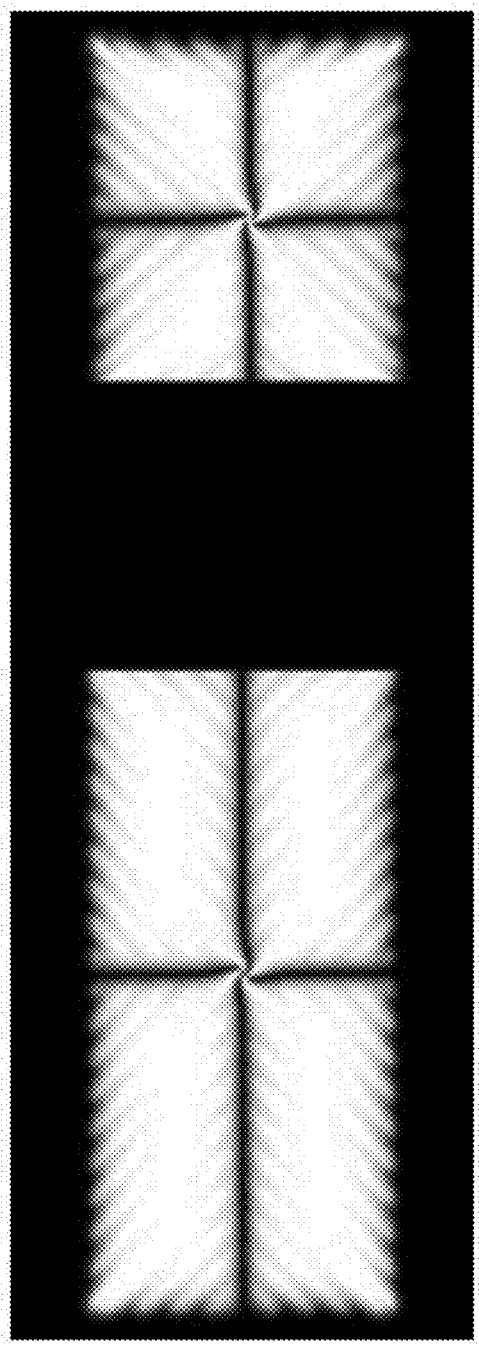

FIG. 9A is a 120 gradation image of a pixel according to an exemplary embodiment of the present inventive concept and FIG. 9B is a 255 gradation image of one pixel according to an exemplary embodiment of the present inventive concept. FIG. 10A is a 120 gradation image for a pixel having only the high gradation or low gradation pixel electrode disposed in one sub-region and including the horizontal stem portion and the vertical stem portion vertically connected to one end of the horizontal stem portion as in comparative examples of FIGS. 6 and 8, and FIG. 10B is a 255 gradation image for the above-mentioned pixel. FIG. 11A is a 120 gradation image for comparative example including a cross stem portion and having only the low gradation or high gradation pixel electrode disposed in one sub-region, and FIG. 11B is a 256 gradation image for the above mentioned comparative example. In addition, FIGS. 9A to 11B are images for a case in which the upper and lower display panels are aligned appropriately, and FIGS. 12A to 14B are the respective images for a case in which the upper and lower display panels are misaligned with each other by 30 μm.

First, referring to FIGS. 9A to 11B, it may be seen that one pixel according to an exemplary embodiment of the present inventive concept hardly has the texture and the arrangement of the liquid crystal molecules is stable even in a space between adjacent sub-pixel electrodes, similar to FIGS. 9A and 9B.

However, according to comparative example 1 such as FIGS. 10A and 10B, it has been confirmed that a number of textures are occurred in the space between adjacent sub-pixel electrodes.

Meanwhile, according to comparative example 2 such as FIGS. 11A and 11B, it has been also confirmed that the texture hardly occurs, similar to an exemplary embodiment of the present inventive concept.

Figure 12A:
Figure 12B:
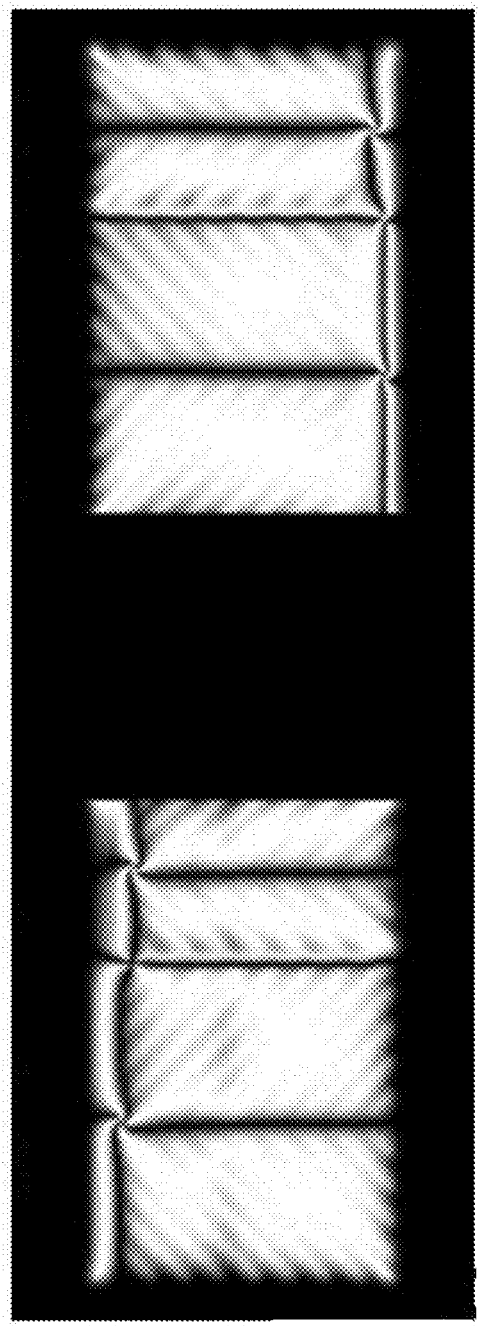

Next, in the case in which the upper and lower display panels are misaligned, referring to FIGS. 12A and 12B which are exemplary embodiments of the present inventive concept, it may be seen that a transmittance and texture is approximately the same as that of FIGS. 9A and 9B despite of the misaligned case. That is, even in the case in which an exemplary embodiment of the present inventive concept is used for a curved display, it may be seen that an exemplary embodiment of the present inventive concept less decreases transmittance and easily controls the texture.

Figure 13A:
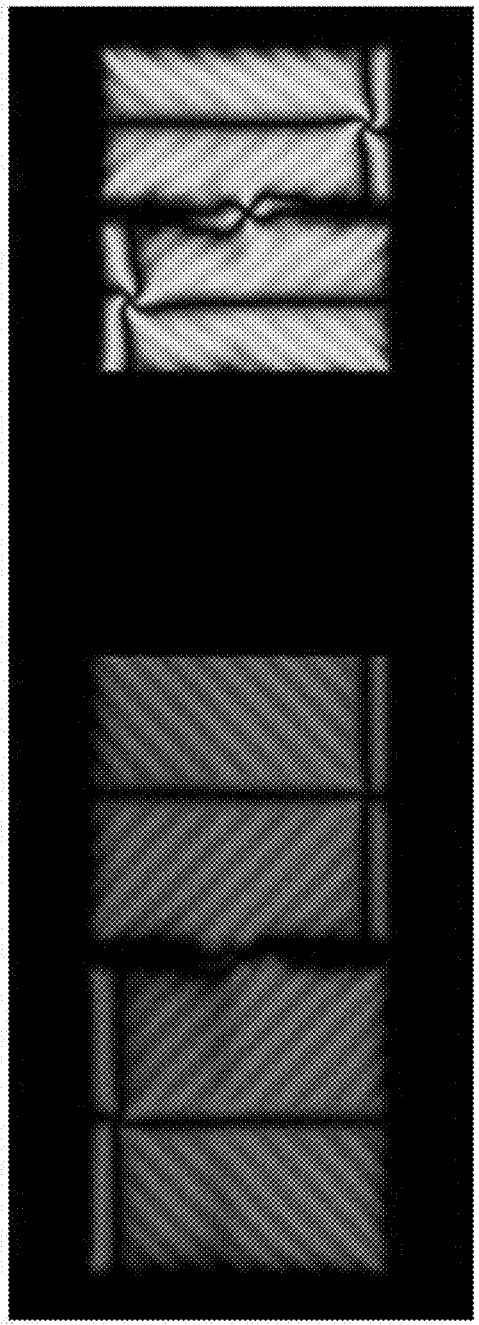
Figure 13B:
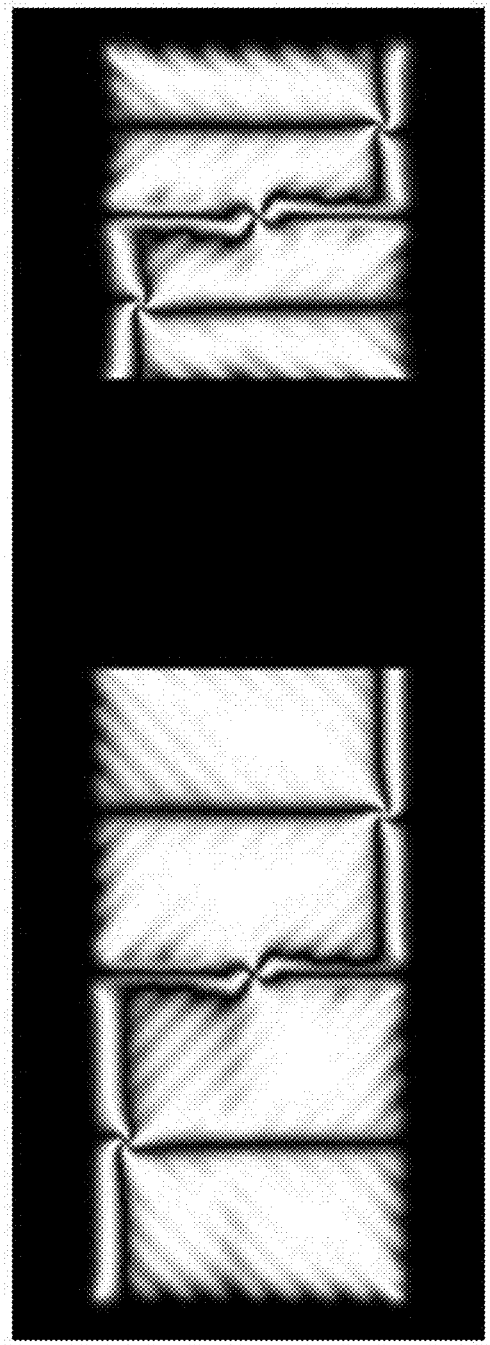

Referring to FIGS. 13A and 13B in which the upper and lower display panels are misaligned for comparative example 1 of FIGS. 10A and 10B, it has been confirmed that a significant texture is present in the space between adjacent sub-pixel electrodes.

Figure 14A:
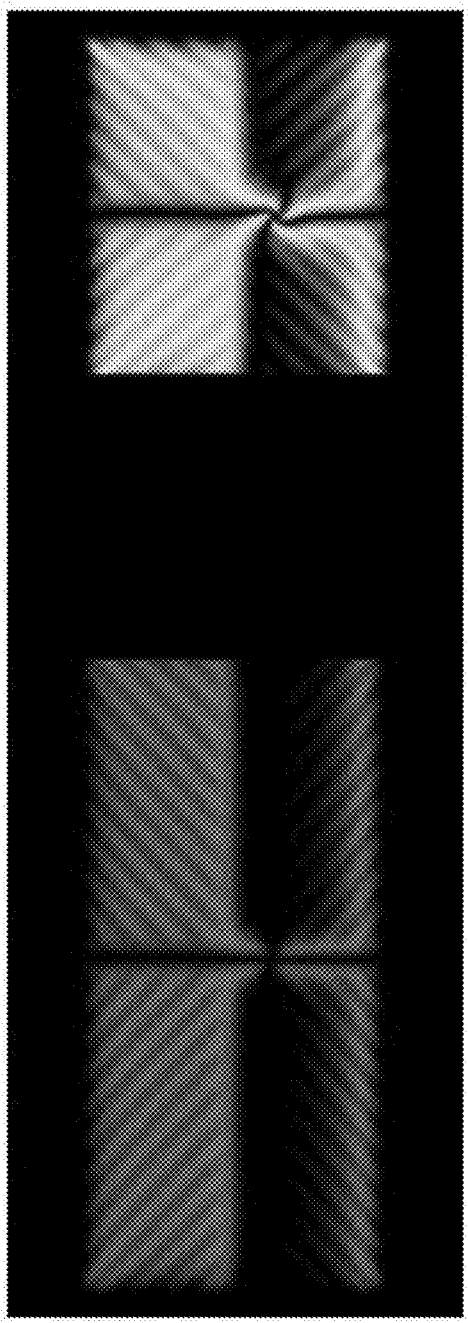
Figure 14B:
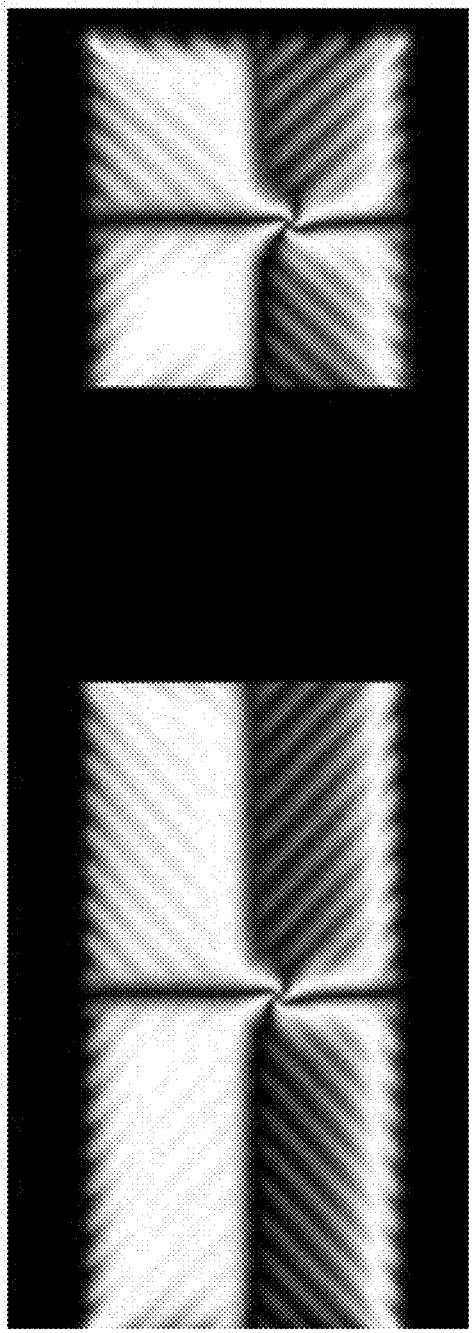
Figure 15:
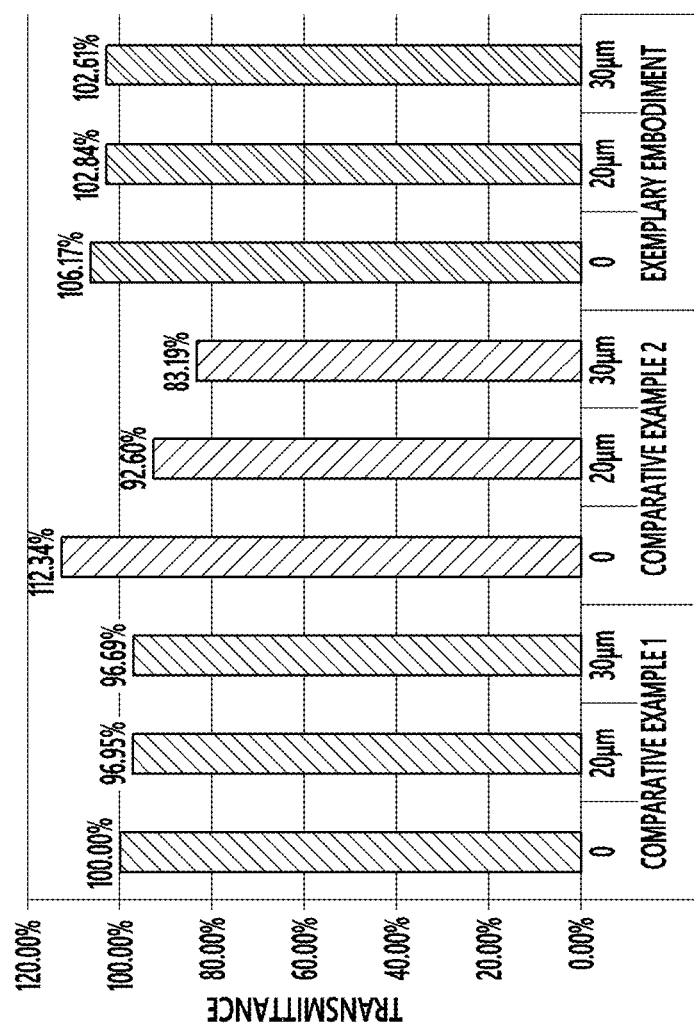
FIG. 15 is a transmittance graph for an exemplary embodiment of the present inventive concept and comparative example.

Referring to FIGS. 14A and 14B in which the upper and lower display panels are misaligned for comparative example 2 of FIGS. 11A and 11B, it has been confirmed that an increase in texture and a decrease in transmittance occurs in about a half of one pixel by the misalignment.

That is, according to FIGS. 9A to 14B, even in the case in which the display according to an exemplary embodiment of the present inventive concept is used for a flat panel display and is used for the curved display as well, the display according to an exemplary embodiment of the present inventive concept may easily control the texture and transmittance. That is, the display having more improved display quality may be provided.

This will be described in more detail through the transmittance graph of FIG. 15.

According to FIG. 15, transmittance of the display according to an exemplary embodiment of the present inventive concept is about 106.17% in the case in which the upper and lower display panels are aligned appropriately. As the upper and lower display panels are misaligned, transmittance of the display is decreased, but the display shows transmittance of about 102.61% even in the case in which the upper and lower display panels are misaligned with each other by about 30 μm.

Meanwhile, comparative example 1 according to FIGS. 10A and 10B shows transmittance of about 100% in the case in which the upper and lower display panels are aligned appropriately and shows transmittance of about 96.69% according to the misalignment. In addition, comparative example 2 according to FIGS. 11A and 11B shows transmittance of about 112.34% in the case in which the upper and lower display panels are aligned appropriately, which is the highest transmittance, but shows transmittance of about 83.19% as the upper and lower display panels are misaligned, which is the lowest transmittance.

The display according to an exemplary embodiment of the present inventive concept shows transmittance by about 6.17% higher than that of comparative example 1 and comparative example 2 which show about 30% transmittance loss due to the misalignment.

That is, according to FIG. 15, it may be seen that the liquid crystal display including the pixel electrode according to an exemplary embodiment of the present inventive concept shows a good transmittance in the case in which the upper and lower display panels are misaligned as well as in the case in which the upper and lower display panels are aligned.

Figure 16:
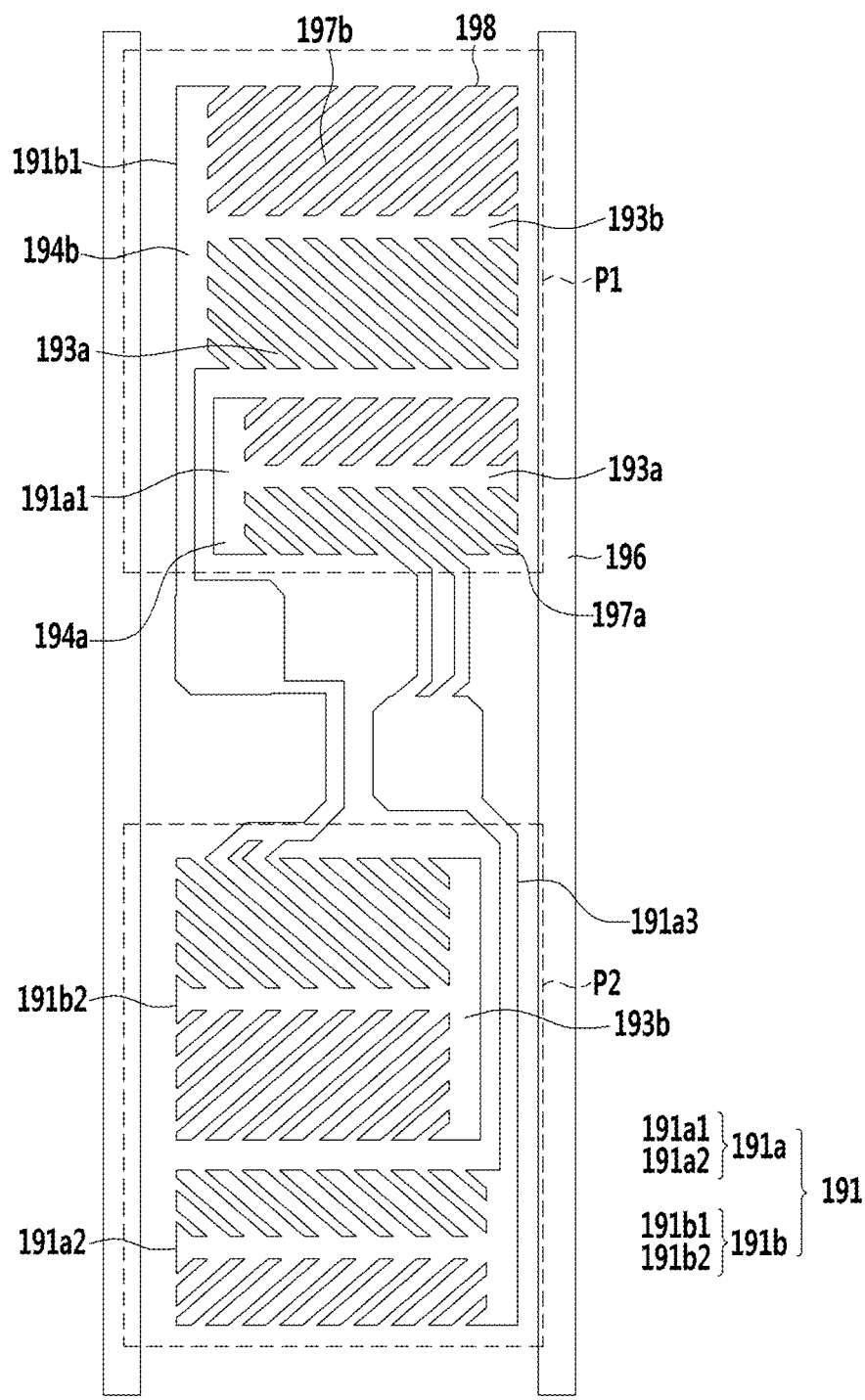
FIG. 16 is a plan view of a pixel electrode layer according to another exemplary embodiment of the present inventive concept.
Figure 17:
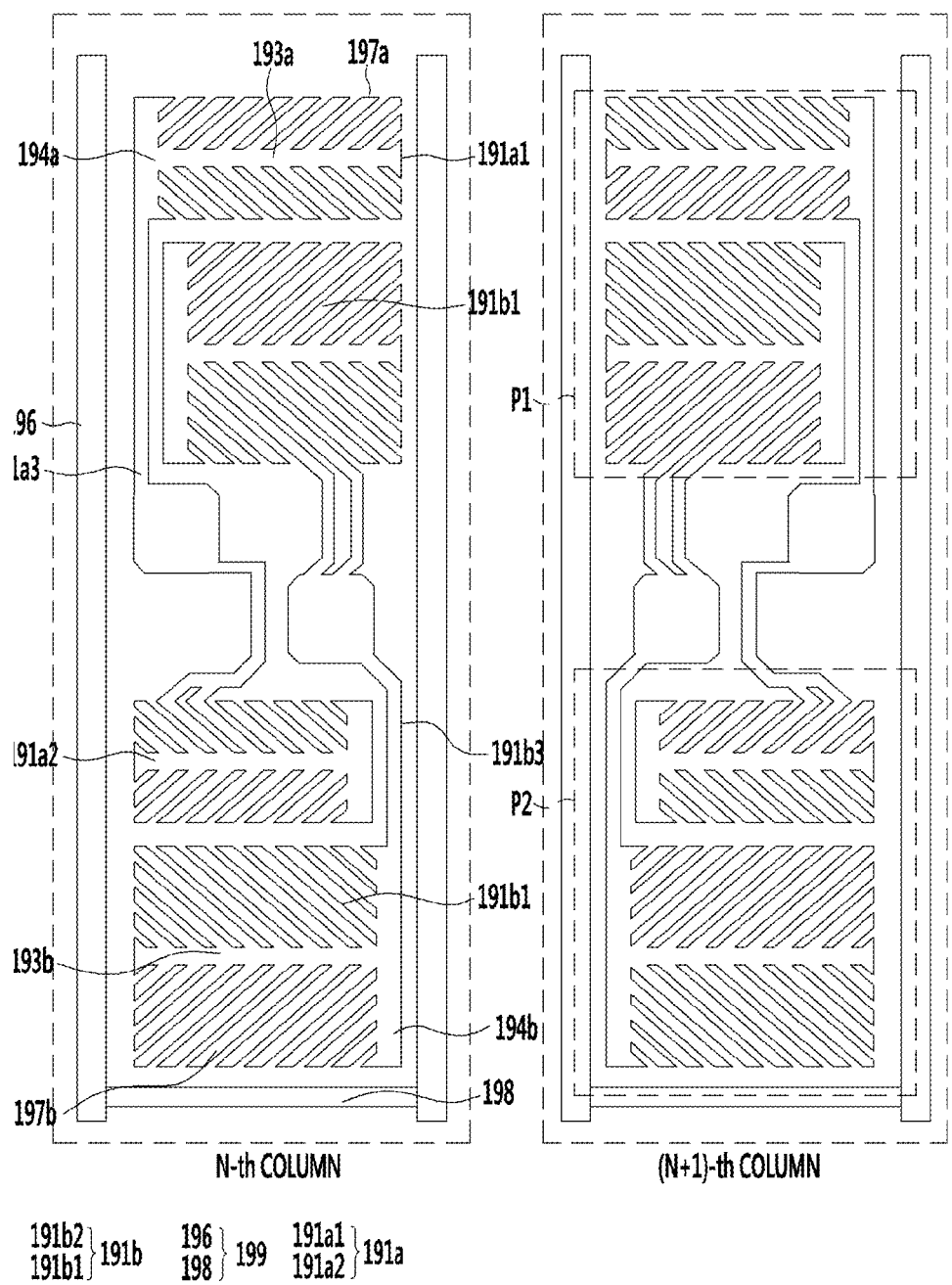
FIGS. 17 and 18 are layout views of a plurality of pixels according to another exemplary embodiment of the present inventive concept.
Figure 18:
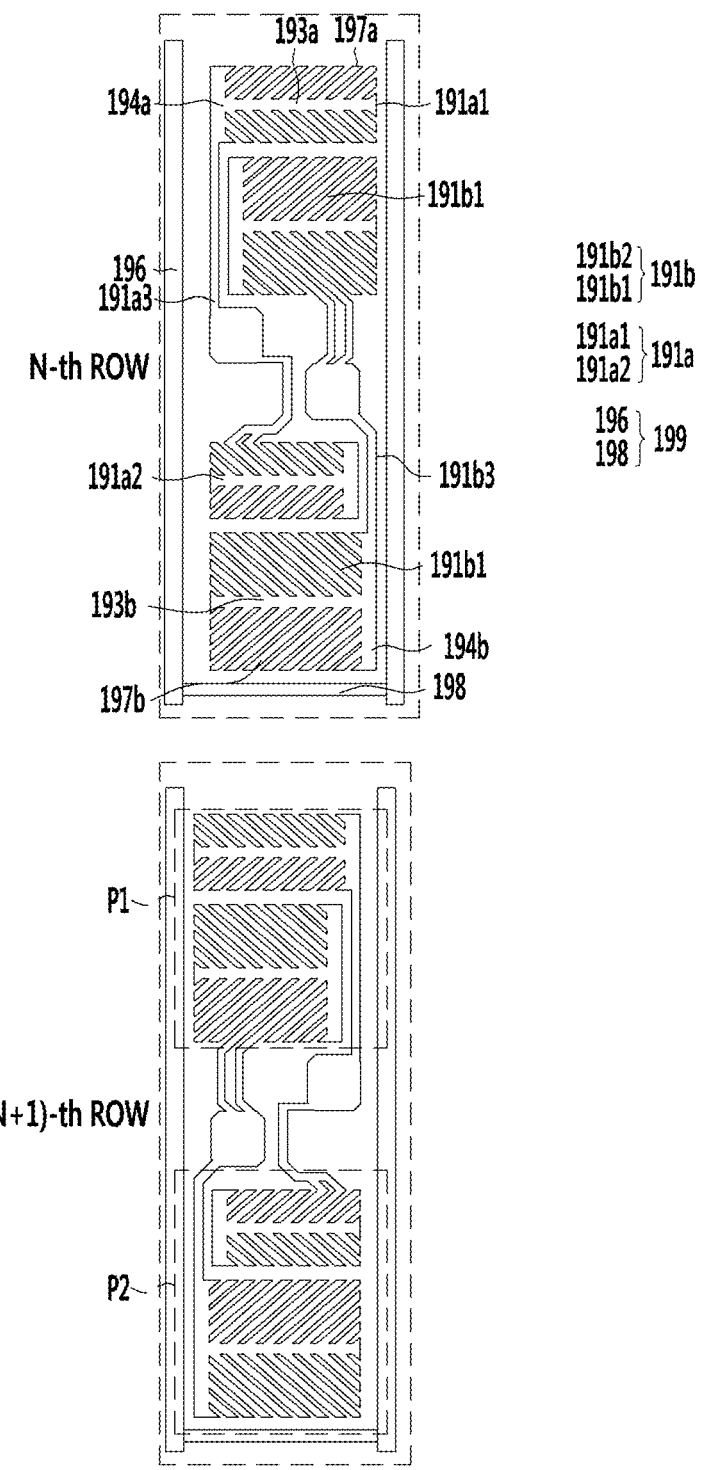

Hereinafter, a liquid crystal display according to another exemplary embodiment of the present inventive concept will be described with reference to FIGS. 16 to 23. The description of components that are the same or similar to those of the exemplary embodiment described above will be omitted. FIG. 16 is a plan view of a pixel electrode layer according to another exemplary embodiment of the present inventive concept, FIGS. 17 and 18 are layout views of a plurality of pixels according to another exemplary embodiment of the present inventive concept, and FIGS. 19 to 23 are circuit diagrams of one pixel according to an exemplary embodiment of the present inventive concept.

First, referring to FIG. 16, similar to FIG. 4, the first high gradation sub-pixel electrode 191$a$1 and the first low gradation sub-pixel electrode 191$b$1 are disposed in the first sub-region P1 and the second high gradation sub-pixel electrode 191$a$2 and the second low gradation sub-pixel electrode 191$b$2 are disposed in the second sub-region P2.

Meanwhile, according to another exemplary embodiment of the present inventive concept, the first low gradation sub-pixel electrode 191$b$1, the first high gradation sub-pixel electrode 191$a$1, the second low gradation sub-pixel electrode 191$b$2, and the second high gradation sub-pixel electrode 191$a$2 are sequentially disposed in a row direction in one pixel. Unlike this, in FIG. 4, the first high gradation sub-pixel electrode 191$a$1, the first low gradation sub-pixel electrode 191$b$1, the second high gradation sub-pixel electrode 191$a$2, and the second low gradation sub-pixel electrode 191$b$2 are disposed in the row direction in one pixel.

That is, FIGS. 4 and 16 show exemplary embodiments in which the high gradation sub-pixel electrode and the low gradation sub-pixel electrode are alternatingly disposed along a column direction. However, the present inventive concept is not limited thereto. For example, any arrangement that the high gradation sub-pixel electrode and the low gradation sub-pixel electrode are disposed in the respective sub-regions may also be possible.

Next, electrodes arrangement between adjacent pixels will be described with reference to FIGS. 17 and 18.

First, referring to FIG. 17, adjacent pixel electrodes along the row direction may have a line of symmetry, the data line 171 disposed between the adjacent pixels. By way of example, the first vertical stem portion 194a and the second vertical stem portion 194b of the first sub-pixel region P1 which are disposed in an n-th column may be disposed on the left of one pixel, and the first vertical stem portion 194a and the second vertical stem portion 194b of the first sub-pixel region P1 which are disposed in an (n+1)-th column may be symmetrically disposed on the right of one pixel.

Similarly, the first vertical stem portion 194a and the second vertical stem portion 194b of the second sub-pixel region P2 which are disposed in an n-th column may be disposed on the right of one pixel, and the first vertical stem portion 194a and the second vertical stem portion 194b of the second sub-pixel region P2 which are disposed in an (n+1)-th column may be symmetrically disposed on the left of one pixel.

Next, referring to FIG. 18, the plurality of pixels which are adjacent to each other along the column direction have positions of the vertical stem portions which are formed to be symmetrical to each other in the column direction. For example, in one pixel of the n-th row, the first vertical stem portion 194a and the second vertical stem portion 194b which are disposed in the first sub-region P1 may be disposed on the left of one pixel, and the first vertical stem portion 194a and the second vertical stem portion 194b which are disposed in the second sub-region P2 may be disposed on the right of one pixel.

Meanwhile, in one pixel of the (n+1)-th row, the first vertical stem portion 194a and the second vertical stem portion 194b which are disposed in the first sub-region P1 may be disposed on the right of one pixel, and the first vertical stem portion 194a and the second vertical stem portion 194b which are disposed in the second sub-region P2 may be disposed on the left of one pixel. That is, one pixel disposed in the n-th row and one pixel disposed in the (n+1)-th row have the positions of the vertical stem portions which are disposed to be symmetrical to each other in the row direction.

The exemplary embodiment of FIGS. 17 and 18 described above is to provide the liquid crystal molecules which are arranged in various directions between the pixels which are adjacent to each other. To this end, any symmetry and arrangement may also be possible. By the above-mentioned various arrangements, side visibility and overall display quality of the display may be improved.

Hereinafter, the circuit diagrams according to another exemplary embodiment of the present inventive concept will be described with reference to FIGS. 19 to 23. The reason is that any liquid crystal display having the circuit diagrams shown in FIGS. 19 to 23 and including the pixel electrode described above may also be implemented.

Figure 19:
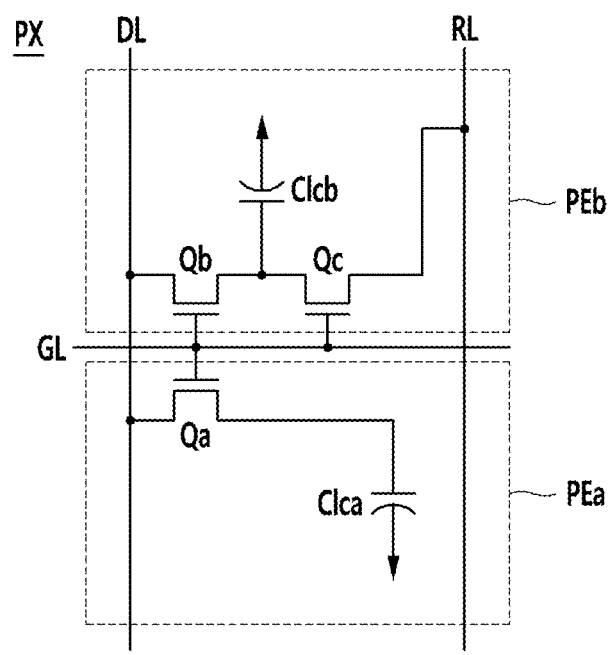
FIGS. 19, 20, 21, 22 and 23 are circuit diagrams of one pixel according to an exemplary embodiment of the present inventive concept.

First, an exemplary embodiment according to a circuit diagram shown in FIG. 19 will be described below. One pixel PX of the display according to an exemplary embodiment of the present inventive concept includes a plurality of signal lines including a gate line GL transferring a gate signal, a data line DL transferring a data signal, and a voltage dividing reference voltage line RL transferring a voltage dividing reference voltage, and first, second and third switching elements Qa, Qb, and Qc and first and second liquid crystal capacitors Clca and Clcb which are connected to the plurality of signal lines.

The first and second switching elements Qa and Qb are each connected to the gate line GL and the data line DL, and the third switching element Qc is connected to an output terminal of the second switching element Qb and the voltage dividing reference voltage line RL.

The first switching element Qa and the second switching element Qb, which are a three-terminal element of a thin film transistor or the like, have a control terminal connected to the gate line GL and an input terminal connected to the data line DL, an output terminal of the first switching element Qa is connected to the first liquid crystal capacitor Clca, and an output terminal of the second switching element Qb is connected to the second liquid crystal capacitor Clcb and an input terminal of the third switching element Qc.

The third switching element Qc, which is also the three-terminal element of the thin film transistor or the like, has a control terminal connected to the gate line GL, an input terminal connected to the second liquid crystal capacitor Clcb, and an output terminal connected to the voltage dividing reference voltage line RL.

When a gate ON signal is applied to the gate line GL, the first switching element Qa, the second switching element Qb, and the third switching element Qc which are connected to the gate line GL are turned on. Consequently, a data voltage applied to the data line DL is applied to the first sub-pixel electrode PXa and the second sub-pixel electrode PXb through the first switching element Qa and the second switching element Qb which are turned on.

In this case, the data voltages applied to the first sub-pixel electrode PXa and the second sub-pixel electrode PXb are equal to each other, and the first liquid crystal capacitor Clca and the second liquid crystal capacitor Clcb are charged with the same value as a difference between a common voltage and the data voltage.

At the same time, the voltage charged in the second liquid crystal capacitor Clcb is divided by the third switching element Qc which is turned on. Thereby, the voltage value charged in the second liquid crystal capacitor Clcb is decreased by the difference between the common voltage and the voltage dividing reference voltage. That is, the voltage charged in the first liquid crystal capacitor Clca is higher than the voltage charged in the second liquid crystal capacitor Clcb.

As such, the voltage charged in the first liquid crystal capacitor Clca and the voltage charged in the second liquid crystal capacitor Clcb are different from each other. Since the voltage of the first liquid crystal capacitor Clca and the voltage of the second liquid crystal capacitor Clcb are different from each other, the tilted angles of the liquid crystal molecules in the first sub-pixel and the second sub-pixel are different, such that luminance of two sub-pixel is different. Therefore, in the case in which the voltage of the first liquid crystal capacitor Clca and the voltage of the second liquid crystal capacitor Clcb are appropriately adjusted, it is possible to maximally match an image viewed from the side to an image viewed from the front, such that side visibility may be improved.

Although the shown exemplary embodiment includes the third switching element Qc connected to the second liquid crystal capacitor Clcb and the voltage dividing reference voltage line RL in order to allow the voltage charged in the first liquid crystal capacitor Clca and the voltage charged in the second liquid crystal capacitor Clcb to be different, the second liquid crystal capacitor Clcb may be connected to a step-down capacitor in the liquid crystal display according to another exemplary embodiment of the present inventive concept. Specifically, some of a charge amount charged in the second liquid crystal capacitor Clcb is charged in the step-down capacitor by including the third switching element including a first terminal connected to a step-down gate line, a second terminal connected to the second liquid crystal capacitor Clcb, and a third terminal connected to the step-down capacitor, such that a charged voltage between the first liquid crystal capacitor Clca and the second liquid crystal capacitor Clcb may also be set to be different from each other. In addition, in the case of the liquid crystal display according to another exemplary embodiment of the present inventive concept, the first liquid crystal capacitor Clca and the second liquid crystal capacitor Clcb are connected to data lines different from each other so as to be applied to data voltages different from each other, such that the charged voltage between the first liquid crystal capacitor Clca and the second liquid crystal capacitor Clcb may also be set to be different from each other. The charged voltage between the first liquid crystal capacitor Clca and the second liquid crystal capacitor Clcb may also be set to be different from each other by other various methods, in addition to the above-mentioned method.

Figure 20:
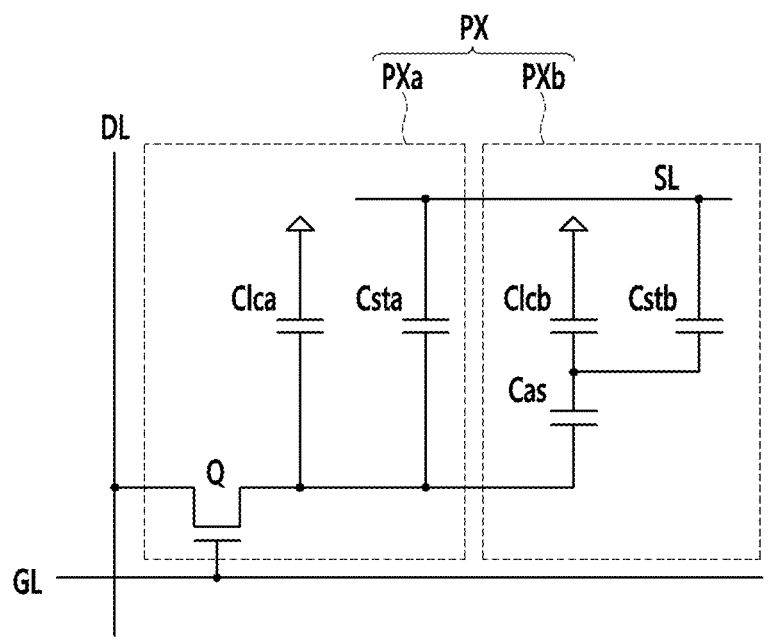

Hereinafter, an exemplary embodiment of FIG. 20 will be described.

The liquid crystal display according to an exemplary embodiment of the present inventive concept includes a signal line including a plurality of gate lines GL, a plurality of data lines DL, and a plurality of voltage dividing reference voltage lines SL, and a plurality of pixels PX connected to the signal line. Each pixel PX includes a pair of first and second sub-pixels PXa and PXb, wherein the first sub-pixel electrode is formed in the first sub-pixel PXa and the second sub-pixel electrode is formed in the second sub-pixel PXb.

The liquid crystal display according to an exemplary embodiment of the present inventive concept further includes a switching element Q connected to the gate line GL and the data line DL, a first liquid crystal capacitor Clca and a first sustain capacitor Csta connected to the switching element Q and formed in the first sub-pixel PXa, a second liquid crystal capacitor Clcb and a second sustain capacitor Cstb connected to the switching element Q and formed in the second sub-pixel PXb, and an auxiliary capacitor Cas formed between the switching element Q and the second liquid crystal capacitor Clcb.

The switching element Q, which is the three-terminal element of the thin film transistor or the like provided in the lower display panel 100, has a control terminal connected to the gate line GL, an input terminal connected to the data line DL, and an output terminal connected to the first liquid crystal capacitor Clca, the first sustain capacitor Csta, and the auxiliary capacitor Cas.

One side terminal of the auxiliary capacitor Cas is connected to the output terminal of the switching element Q and the other side terminal thereof is connected to the second liquid crystal capacitor Clcb and the second sustain capacitor Cstb.

A charged voltage of the second liquid crystal capacitor Clcb is decreased to be lower than a charged voltage of the first liquid crystal capacitor Clca by the auxiliary capacitor Cas, such that side visibility of the liquid crystal display may be improved.

Figure 21:
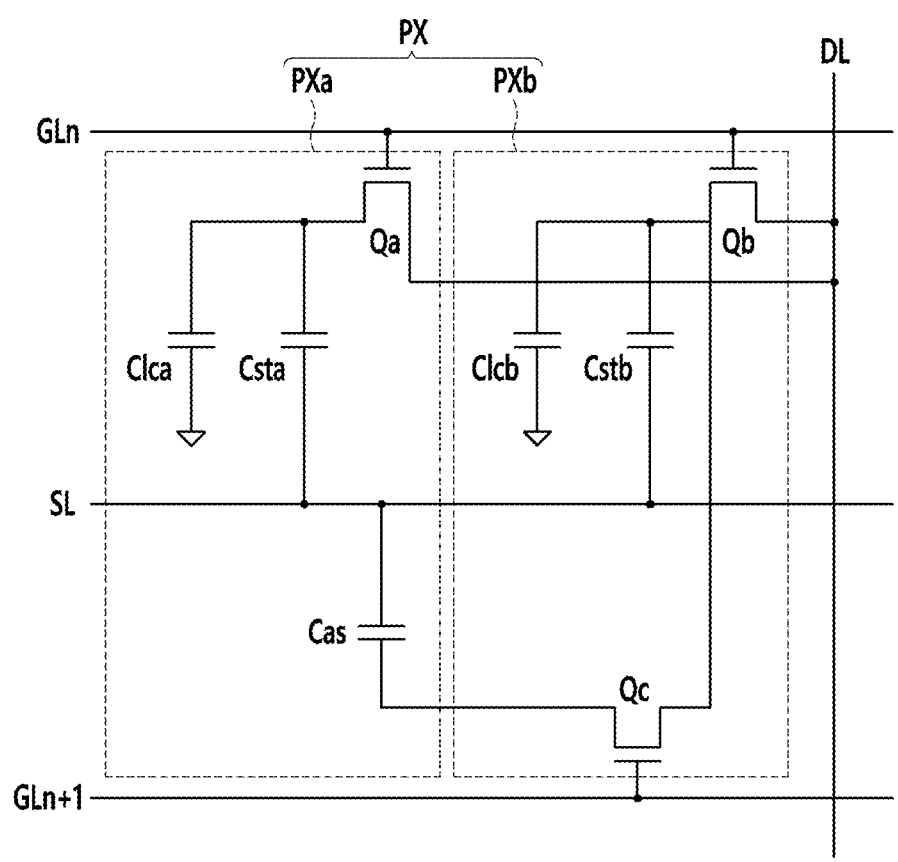

Hereinafter, an exemplary embodiment of FIG. 21 will be described.

The liquid crystal display according to an exemplary embodiment of the present inventive concept includes a signal line including a plurality of gate lines GLn and GLn+1, a plurality of data lines DL, and a plurality of voltage dividing reference voltage lines SL, and a plurality of pixels PX connected to the signal line. Each pixel PX includes a pair of first and second sub-pixels PXa and PXb, wherein the first sub-pixel electrode is formed in the first sub-pixel PXa and the second sub-pixel electrode is formed in the second sub-pixel PXb.

The liquid crystal display according to an exemplary embodiment of the present inventive concept further includes a first switching element Qa and a second switching element Qb which are connected to the gate line GLn and the data line DL, a first liquid crystal capacitor Clca and a first sustain capacitor Csta connected to the first switching element Qa and formed in the first sub-pixel PXa, a second liquid crystal capacitor Clcb and a second sustain capacitor Cstb connected to the second switching element Qb and formed in the second sub-pixel PXb, a third switch element Qc connected to the second switching element Qb and switched by the gate line GLn+1 of a next stage, and an auxiliary capacitor Cas connected to the third switching element Qc.

The first switching element Qa and the second switching element Qb, which are the three-terminal element of the thin film transistor or the like provided in the lower display panel 100, have a control terminal connected to the gate line GLn, an input terminal connected to the data line DL, and an output terminal which are each connected to the first liquid crystal capacitor Clca and the first sustain capacitor Csta, and the second liquid crystal capacitor Clcb and the second sustain capacitor Cstb.

The third switching element Qc, which is also the three-terminal element of the thin film transistor or the like provided on the lower display panel 100, has a control terminal connected to the gate line GLn+1 of the next stage, an input terminal connected to the second liquid crystal capacitor Clcb, and an output terminal connected to an auxiliary capacitor Cas.

One side terminal of the auxiliary capacitor Cas is connected to the output terminal of the third switching element Qc and the other side terminal thereof is connected to the voltage dividing reference voltage line SL.

An operation of the liquid crystal display according to an exemplary embodiment of the present inventive concept will be described. When a gate ON voltage is applied to the gate line GLn, the first switching element and the second switching element Qa and Qb connected to the gate line GLn are turned on, and the data voltage of the data line 171 is applied to the first and second sub-pixel electrodes.

Next, when a gate OFF voltage is applied to the gate line GLn and the gate ON voltage is applied to the gate line GLn+1 of the next stage, the first and second switching elements Qa and Qb are turned off and the third switching element Qc is turned on. Therefore, charges in the second sub-pixel electrode connected to the output terminal of the second switching element Qb flow into the auxiliary capacitor Cas, such that a voltage of the second liquid crystal capacitor Clcb drops.

As such, the charged voltages of the first and second liquid crystal capacitors Clca and Clcb are formed to be different from each other, such that side visibility of the liquid crystal display may be improved.

Figure 22:
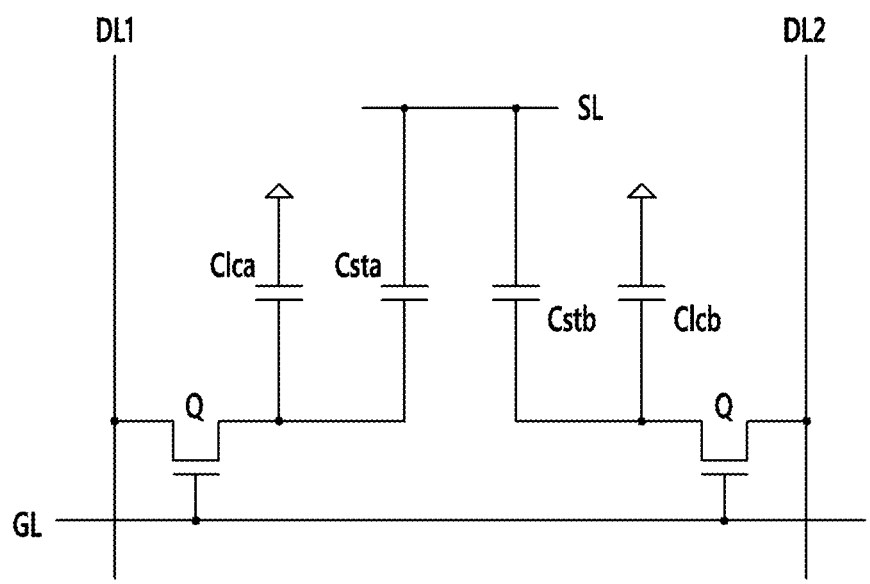

Hereinafter, an exemplary embodiment of FIG. 22 will be described.

The liquid crystal display according to an exemplary embodiment of the present inventive concept includes a signal line including a plurality of gate lines GL, a plurality of data lines DL1 and DL2, and a plurality of voltage dividing reference voltage lines SL, and a plurality of pixels PX connected to the signal line. Each pixel PX includes a pair of first and second liquid crystal capacitors Clca and Clcb and first and second sustain capacitors Csta and Cstb.

Each sub-pixel includes one liquid crystal capacitor and one sustain capacitor, and additionally includes one thin film transistor Q. The thin film transistor Q of two sub-pixels that belong to one pixel is connected to the same gate line GL, but is connected to different data lines DL1 and DL2. The different data lines DL1 and DL2 simultaneously apply different levels of data voltages to the first and second liquid crystal capacitors Clca and Clcb of the two sub-pixels so as to have the charged voltages different from each other. As a result, side visibility of the liquid crystal display may be improved.

Hereinafter, an exemplary embodiment of FIG. 23 will be described.

Figure 23:
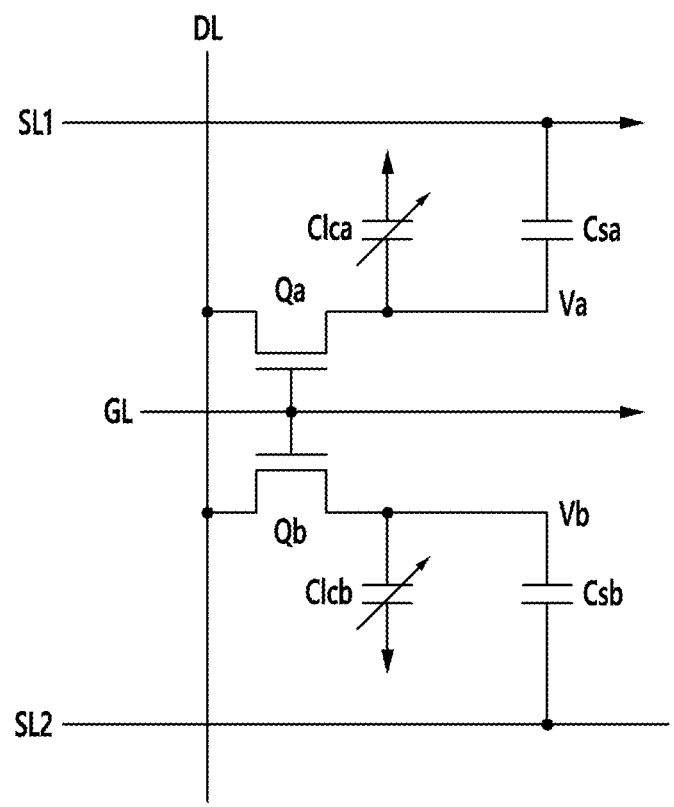

The liquid crystal display according to an exemplary embodiment of the present inventive concept includes a gate line GL, a data line DL, a first power line SL1, a second power line SL2, and a first switching element Qa and a second switching element Qb which are connected to the gate line GL and the data line DL, as shown in FIG. 23.

The liquid crystal display according to an exemplary embodiment of the present inventive concept further includes an auxiliary step-up capacitor Csa and a first liquid crystal capacitor Clca which are connected to the first switching element Qa, and an auxiliary step-down capacitor Csb and a second liquid crystal capacitor Clcb which are connected to the second switching element Qb.

The first switching element Qa and the second switching element Qb are configured by the three-terminal element of the thin film transistor or the like. The first switching element Qa and the second switching element Qb are connected to the same gate line GL and the same data line DL, so as to be turned on at the same timing and output the same data signal.

The first power line SL1 and the second power line SL2 are applied with swung voltages while having a predetermined period. The first power line SL1 is applied with a first low voltage during a predetermined period (e.g., 1 H) and is applied with a first high voltage during a next predetermined period. The second power line SL2 is applied with a second high voltage during a predetermined period and is applied with a second low voltage during a next predetermined period. In this case, the first period and the second period are repeated multiple times during one frame, such that the first power line SL1 and the second power line SL2 are applied with the swung voltages. In this case, the first low voltage and the second low voltage may be the same and the first high voltage and the second high voltage may be the same.

The auxiliary step-up capacitor Csa is connected to the first switching element Qa and the first power line SL1 and the auxiliary step-down capacitor Csb is connected to the second switching element Qb and the second power line SL2.

A voltage Va of a terminal (hereinafter, referred to as 'first terminal') of a portion that the auxiliary step-up capacitor Csa is connected to the first switching element Qa is decreased when the first low voltage is applied to the first power line SL1 and is increased when the first high voltage is applied to the first power line SL1. Then, as the voltage of the first power line SL1 is swung, the voltage Va of the first terminal is also swung.

In addition, a voltage Vb of a terminal (hereinafter, referred to as 'second terminal') of a portion that the auxiliary step-down capacitor Csb is connected to the second switching element Qb is increased when the second high voltage is applied to the second power line SL2 and is decreased when the second low voltage is applied to the second power line SL2. Then, as the voltage of the second power line SL2 is swung, the voltage Vb of the second terminal is also swung.

As such, since the voltages Va and Vb of the pixel electrodes of the two sub-pixels are changed depending on magnitude of the swung voltage in the first and second power lines SL1 and SL2 even in the case in which the same data voltage is applied to the two sub-pixels, transmittance of the two sub-pixels may be different and side visibility may be improved, accordingly.

According to the liquid crystal display as described above, the texture may be suppressed and improved transmittance may be secured even in the case in which the display is bent. That is, the display having improved display quality may be provided.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display, comprising:
   a first insulating substrate;
   a gate line and a data line disposed on the first insulating substrate and intersecting with each other to be insulated from each other;
   a thin film transistor connected to the gate line and the data line;
   a pixel electrode connected to the thin film transistor and comprising a high gradation sub-pixel electrode connected to the thin film transistor and a low gradation sub-pixel electrode; and
   a second insulating substrate facing the first insulating substrate,
   wherein one pixel includes the thin film transistor and the pixel electrode and includes a first sub-region and a second sub-region which are separated by the gate line intervened therebetween,
   wherein the high gradation sub-pixel electrode includes a first high gradation sub-pixel electrode disposed in the first sub-region, a second high gradation sub-pixel electrode disposed in the second sub-region, and a first connecting portion connecting the first high gradation sub-pixel electrode and the second high gradation sub-pixel electrode, the first connecting portion including a first pad portion connected to the thin film transistor, and
   wherein the low gradation sub-pixel electrode includes a first low gradation sub-pixel electrode disposed in the first sub-region, and a second low gradation sub-pixel electrode disposed in the second sub-region.

2. The liquid crystal display of claim 1, wherein:
   the high gradation sub-pixel electrode includes
   a first horizontal stem portion,
   a first vertical stem portion vertically connected to one end of the first horizontal stem portion, and
   a first fine branch portion extending from the first horizontal stem portion and the first vertical stem portion, and
   the low gradation sub-pixel electrode includes
   a second horizontal stem portion, a second vertical stem portion vertically connected to one end of the second horizontal stem portion, and a second fine branch portion extending from the second horizontal stem portion and the second vertical stem portion.

3. The liquid crystal display of claim 2, wherein:

the first connecting portion and the second vertical stem portion are adjacent to each other to be parallel to each other.

4. The liquid crystal display of claim 2, further comprising:

a voltage dividing reference voltage line disposed on the same layer as that of the data line, wherein the voltage dividing reference voltage line overlaps end portions of the first vertical stem portion, the second vertical stem portion, the first fine branch portion, and the second fine branch portion.

5. The liquid crystal display of claim 2, wherein:

in a plurality of pixels which are adjacent to each other along a column direction, the first and second vertical stem portions in adjacent pixels are symmetrical to each other in the column direction.

6. The liquid crystal display of claim 2, wherein:

the first and second vertical stem portions which are each disposed in the first sub-region and the second sub-region are disposed on a same side of the pixel electrode.

7. The liquid crystal display of claim 2, wherein:

the first and second vertical stem portions which are disposed in the first sub-region and the first and second vertical stem portions which are disposed in the second sub-region are alternately disposed on a left side of the pixel electrode and the right side of the pixel electrode.

8. The liquid crystal display of claim 1, wherein:

the first low gradation sub-pixel electrode and the second low gradation sub-pixel electrode are connected to each other by a second connecting portion.

9. The liquid crystal display of claim 1, wherein:

in a plurality of pixels which are adjacent to each other along a row direction, adjacent pixel electrodes have al line of symmetry.

10. The liquid crystal display of claim 1, wherein:

in the first sub-region and the second sub-region, the high gradation sub-pixel electrode and the low gradation sub-pixel electrode which are adjacent to each other are spaced apart about 3 µm to about 10 µm.

11. The liquid crystal display of claim 1, wherein:

the first sub-region and the second sub-region have an area ratio of about 1:1.

12. The liquid crystal display of claim 1, further comprising:

a gate insulating layer disposed on the gate line, and a passivation layer disposed on the data line.

13. The liquid crystal display of claim 1, wherein:

the liquid crystal display is a curved type.

14. The liquid crystal display of claim 8, wherein:

the second connecting portion including a second pad portion connected to a second thin film transistor.

* * * * *